US012242212B2

(12) United States Patent
Nohara

(10) Patent No.: US 12,242,212 B2
(45) Date of Patent: Mar. 4, 2025

(54) DEVELOPER STORAGE CONTAINER AND IMAGE FORMING APPARATUS

(71) Applicant: KYOCERA Document Solutions Inc., Osaka (JP)

(72) Inventor: Yuta Nohara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/284,509

(22) PCT Filed: Feb. 17, 2022

(86) PCT No.: PCT/JP2022/006322
§ 371 (c)(1),
(2) Date: Sep. 27, 2023

(87) PCT Pub. No.: WO2022/224566
PCT Pub. Date: Oct. 27, 2022

(65) Prior Publication Data

US 2024/0176261 A1 May 30, 2024

(30) Foreign Application Priority Data

Apr. 19, 2021 (JP) ................................ 2021-070499

(51) Int. Cl.
*G03G 15/08* (2006.01)

(52) U.S. Cl.
CPC ................................ *G03G 15/0872* (2013.01)

(58) Field of Classification Search
CPC ........... G03G 15/0865; G03G 15/0867; G03G 15/0868; G03G 15/087; G03G 15/0872
See application file for complete search history.

(56) References Cited

U.S. PATENT DOCUMENTS

| | | | | |
|---|---|---|---|---|
| 5,765,079 A * | 6/1998 | Yoshiki | G03G 15/0868 222/DIG. 1 |
| 8,989,636 B2 * | 3/2015 | Hori | G03G 15/0881 399/106 |
| 2002/0102113 A1 | 8/2002 | Kusano et al. | |
| 2011/0058857 A1 * | 3/2011 | Hori | G03G 15/0867 399/262 |

(Continued)

FOREIGN PATENT DOCUMENTS

| | | |
|---|---|---|
| JP | 2002221858 A | 8/2002 |
| JP | 2006071762 A | 3/2006 |

(Continued)

*Primary Examiner* — Carla J Therrien

(74) *Attorney, Agent, or Firm* — Alleman Hall & Tuttle LLP

(57) ABSTRACT

A developer storage container includes: a container body which includes an opening portion opened toward a conveying direction along a rotation shaft and is rotated in a specific direction about the rotation shaft to convey toner stored therein in the conveying direction and discharge the toner from the opening portion; a cap portion which downwardly guides the toner discharged from the opening portion at a position more on a downstream side of the conveying direction than the opening portion; and an extension portion which is formed integrally with the container body and extends from inside the container body toward the downstream side of the conveying direction beyond the opening portion.

4 Claims, 21 Drawing Sheets

(56) References Cited

U.S. PATENT DOCUMENTS

| | | | | |
|---|---|---|---|---|
| 2015/0331363 | A1* | 11/2015 | Takami | G03G 15/0879 399/103 |
| 2017/0293241 | A1 | 10/2017 | Murata | |
| 2022/0334512 | A1* | 10/2022 | Nohara | G03G 15/0865 |
| 2022/0334514 | A1* | 10/2022 | Nohara | G03G 15/087 |
| 2022/0334515 | A1* | 10/2022 | Nohara | G03G 15/0874 |
| 2022/0334533 | A1* | 10/2022 | Nohara | G03G 21/1633 |

FOREIGN PATENT DOCUMENTS

| | | | | |
|---|---|---|---|---|
| JP | 2013080027 | A | * | 5/2013 |
| JP | 2017187673 | A | | 10/2017 |

* cited by examiner

DEVELOPER STORAGE CONTAINER AND IMAGE FORMING APPARATUS

TECHNICAL FIELD

The present invention relates to a developer storage container and an image forming apparatus.

BACKGROUND

An image forming apparatus such as a printer, which is capable of forming an image using electrophotography, includes a developer storage container that stores developer such as toner. The developer storage container includes a container body and a guide portion. The container body is rotated in a specific direction about a rotation shaft disposed along a horizontal plane, to convey the developer stored therein in a conveying direction along the rotation shaft and discharge the developer from an opening portion formed at an end portion on a downstream side of the conveying direction. The guide portion downwardly guides the developer discharged from the opening portion at a position more on the downstream side of the conveying direction than the opening portion.

There is also known an image forming apparatus including a stirring member which extends from inside the container body toward the downstream side of the conveying direction beyond the opening portion for suppressing coagulation of the developer that adheres onto the guide portion (see Patent Literature 1).

CITATION LIST

Patent Literature

Patent Literature 1: Japanese Patent Application Publication No. 2006-71762

SUMMARY

Technical Problem

In the image forming apparatus described above, however, the container body and the stirring member are constituted by different members, and thus troublesome tasks of attaching the stirring member to the container body during manufacturing of the developer storage container are caused.

The present invention aims at providing a developer storage container and an image forming apparatus that are capable of reducing troublesome tasks caused during manufacturing of the developer storage container.

Solution to Problem

A developer storage container according to an aspect of the present invention is used in an attitude in which a rotation shaft thereof is disposed along a horizontal plane and includes a container body, a guide portion, and an extension portion. The container body includes an opening portion opened toward a conveying direction along the rotation shaft and is rotated in a specific direction about the rotation shaft to convey developer stored therein in the conveying direction and discharge the developer from the opening portion. The guide portion downwardly guides the developer discharged from the opening portion at a position more on a downstream side of the conveying direction than the opening portion. The extension portion is formed integrally with the container body and extends from inside the container body toward the downstream side of the conveying direction beyond the opening portion.

An image forming apparatus according to another aspect of the present invention includes the developer storage container and an image forming portion. The image forming portion forms an image using the developer supplied from the developer storage container.

Advantageous Effects of Invention

According to the present invention, troublesome tasks caused during manufacturing of the developer storage container can be reduced.

DETAILED DESCRIPTION

Figure 1:
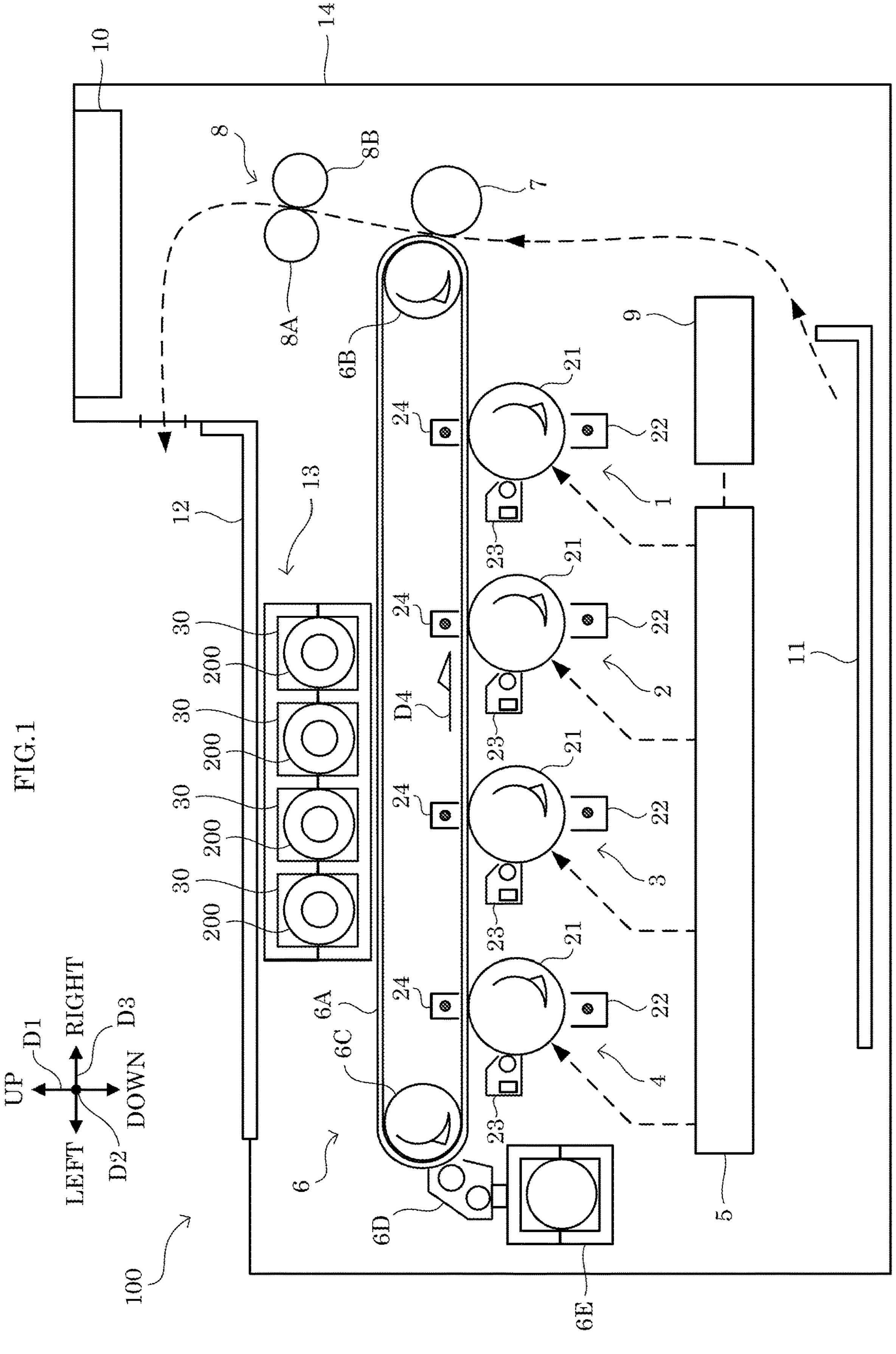
FIG. 1 is a cross-sectional view showing a configuration of an image forming apparatus according to an embodiment of the present invention.

An embodiment of the present invention will be described below with reference to the accompanying drawings. It is noted that the following embodiment is an example of embodying the present invention and does not limit the technical scope of the present invention.

[Configuration of image forming apparatus 100] First, a configuration of the image forming apparatus 100 according to the embodiment of the present invention will be described with reference to FIG. 1.

It is noted that in descriptions below, an up-down direction D1 is defined using a state where the image forming apparatus 100 is installed as a reference. In addition, a front-rear direction D2 is defined with a side on which a toner container 200 is inserted with respect to the image forming apparatus 100 being a front side (front surface side). In addition, a left-right direction D3 is defined seeing the image forming apparatus 100 from the front side (front surface side).

The image forming apparatus 100 is an apparatus having at least a printing function. The image forming apparatus 100 uses developer including toner (an example of developer of the present invention) to print an image on a printing sheet which is a sheet member. For example, the image forming apparatus 100 is a color printer. It is noted that the image forming apparatus 100 may be a monochrome printer, or may be a facsimile apparatus, a copying machine, a multifunction peripheral, or the like.

The image forming apparatus 100 is a so-called tandem-type color image forming apparatus. As shown in FIG. 1, the image forming apparatus 100 includes a plurality of image forming portions 1 to 4, a laser scanning unit 5, an intermediate transfer unit 6, a secondary transfer device 7, a fixing device 8, a control portion 9, an operation display portion 10, a sheet feed tray 11, a sheet discharge tray 12, and a toner replenishing portion 13. These constituent elements are attached to a housing 14 constituting an external frame (not shown), an internal frame, and the like of the image forming apparatus 100.

The image forming portions 1 to 4 respectively form toner images of different colors on a plurality of photoconductor drums 21 arranged next to one another by so-called electrophotography. The toner images are sequentially transferred onto a running (moving) intermediate transfer belt 6A so as to overlap one another. As shown in FIG. 1, the image forming portions 1 to 4 are arranged in line in the stated order of a black image forming portion 1, a yellow image forming portion 2, a cyan image forming portion 3, and a magenta image forming portion 4 from a downstream side of a moving direction D4 of the intermediate transfer belt 6A.

Each of the image forming portions 1 to 4 is provided below the intermediate transfer belt 6A. Each of the image forming portions 1 to 4 includes the photoconductor drum 21 that carries a toner image, a charging device 22, a developing device 23, a primary transfer device 24, and the like. A surface of the photoconductor drum 21 is charged by the charging device 22, and the charged surface of the photoconductor drum 21 is exposed and scanned by the laser scanning unit 5. Thus, an electrostatic latent image is formed on the surface of the photoconductor drum 21. The developing device 23 develops the electrostatic latent image using toner. Then, the toner image on the photoconductor drum 21 is transferred onto the intermediate transfer belt 6A by the primary transfer device 24.

The intermediate transfer unit 6 includes the intermediate transfer belt 6A, a drive roller 6B, a driven roller 6C, and a belt cleaning device 6D. The intermediate transfer belt 6A carries a toner image constituted of toner images in a plurality of colors (four colors in the present embodiment). The intermediate transfer belt 6A is supported by the drive roller 6B and the driven roller 6C in a rotationally-drivable manner, and a surface thereof is movable while being in contact with the surface of each of the photoconductor drums 21. As the intermediate transfer belt 6A is rotationally driven, the surface thereof passes between the photoconductor drum 21 and the primary transfer device 24. At that time, the toner images of the respective colors respectively carried by the plurality of photoconductor drums 21 are sequentially transferred onto the intermediate transfer belt 6A so as to overlap one another.

The toner replenishing portion 13 is provided above the intermediate transfer unit 6. The toner replenishing portion 13 supplies toner of the corresponding colors to the image forming portions 1 to 4, respectively.

The secondary transfer device 7 transfers the toner image transferred onto the intermediate transfer belt 6A onto a printing sheet conveyed from the sheet feed tray 11. The printing sheet onto which the toner image has been transferred is conveyed to the fixing device 8 by a conveying portion (not shown). The fixing device 8 includes a heating roller 8A and a pressure roller 8B. The fixing device 8 conveys the printing sheet onto which the toner image has been transferred while applying heat and pressure. Thus, the toner image melts to be fixed onto the printing sheet. The printing sheet onto which the toner image has been fixed is further conveyed toward the downstream side to be discharged onto and retained in the tray-type sheet discharge tray 12 arranged above the intermediate transfer unit 6.

The belt cleaning device 6D removes and recovers waste toner that has remained on the surface of the intermediate transfer belt 6A, and discharges the recovered waste toner into a waste toner container 6E.

The control portion 9 includes control equipment such as a CPU, a ROM, a RAM, and an EEPROM (registered trademark) (not shown). The CPU is a processor which executes various types of calculation processing. The ROM is a nonvolatile storage device which stores in advance information such as control programs for causing the CPU to execute various types of processing. The RAM is a volatile or nonvolatile storage device. The EEPROM is a nonvolatile storage device. The RAM and the EEPROM are each used as a temporary storage memory (working area) for the various types of processing to be executed by the CPU. In the control portion 9, the various control programs stored in advance in the ROM are executed by the CPU. Thus, the image forming apparatus 100 is collectively controlled by the control portion 9. It is noted that the control portion 9 may be constituted by an electronic circuit such as an integrated circuit (ASIC), or may be a control portion provided separately from a main control portion that collectively controls the image forming apparatus 100.

The operation display portion 10 includes a display portion such as a liquid crystal display that displays various types of information in response to control instructions from the control portion 9, and an operation portion such as operation keys or a touch panel used for inputting various types of information to the control portion 9 in response to user operations.

[Configuration of toner replenishing portion 13] Next, the toner replenishing portion 13 will be described with reference to FIG. 1 to FIG. 10.

As shown in FIG. 1, the toner replenishing portion 13 includes toner containers 200 (an example of a developer storage container of the present invention) respectively corresponding to the respective colors of black, yellow, cyan, and magenta and attachment portions 30 to which the toner containers 200 are respectively attached.

Figure 2:
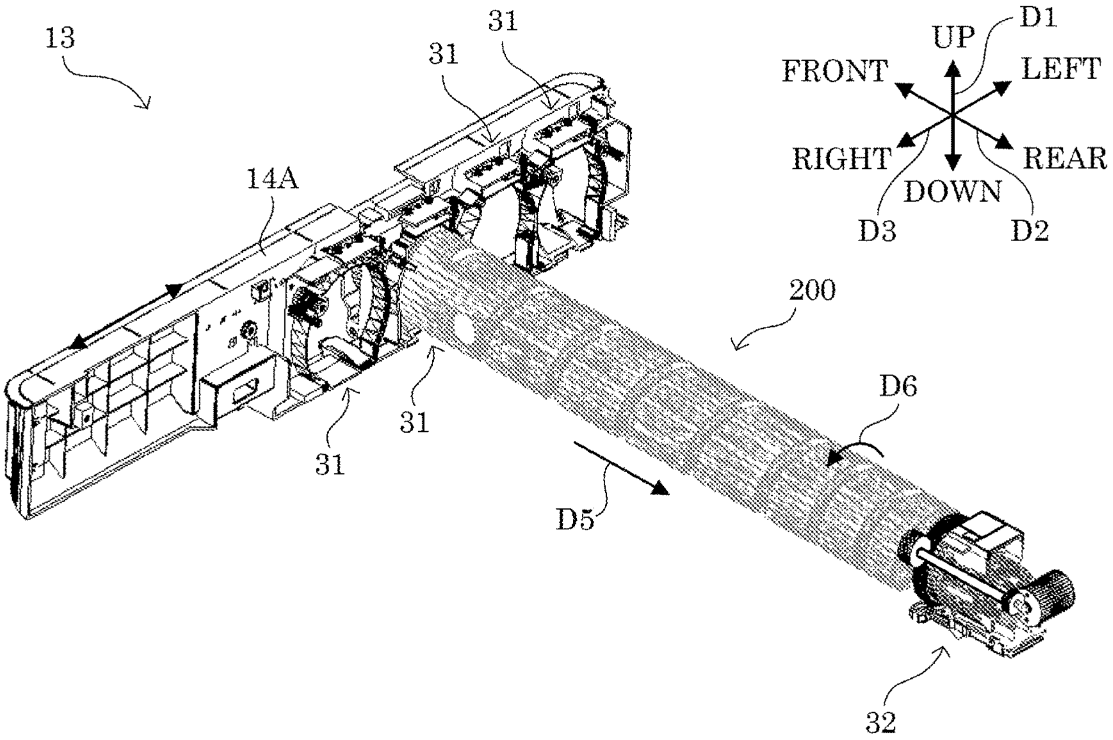
FIG. 2 is a perspective view showing a configuration of a toner replenishing portion of the image forming apparatus according to the embodiment of the present invention.
Figure 5:
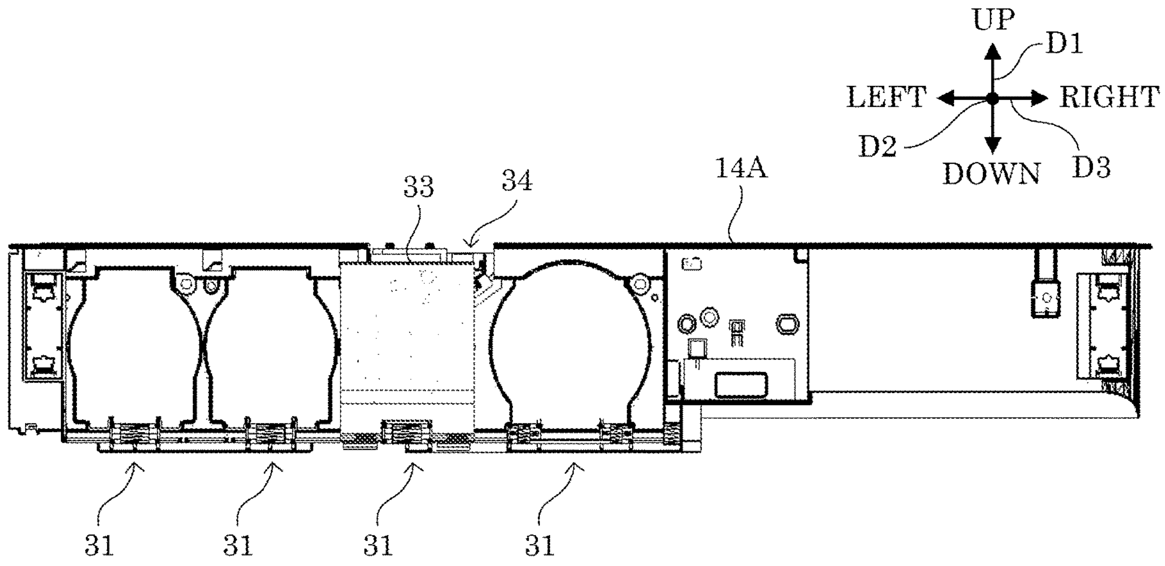
FIG. 5 is a front view showing a configuration of an insertion slot portion of the image forming apparatus according to the embodiment of the present invention.

In addition, as shown in FIG. 2 and FIG. 5, the toner replenishing portion 13 includes an insertion slot portion 31, a drive portion 32, and a lock cover 33.

Figure 7:
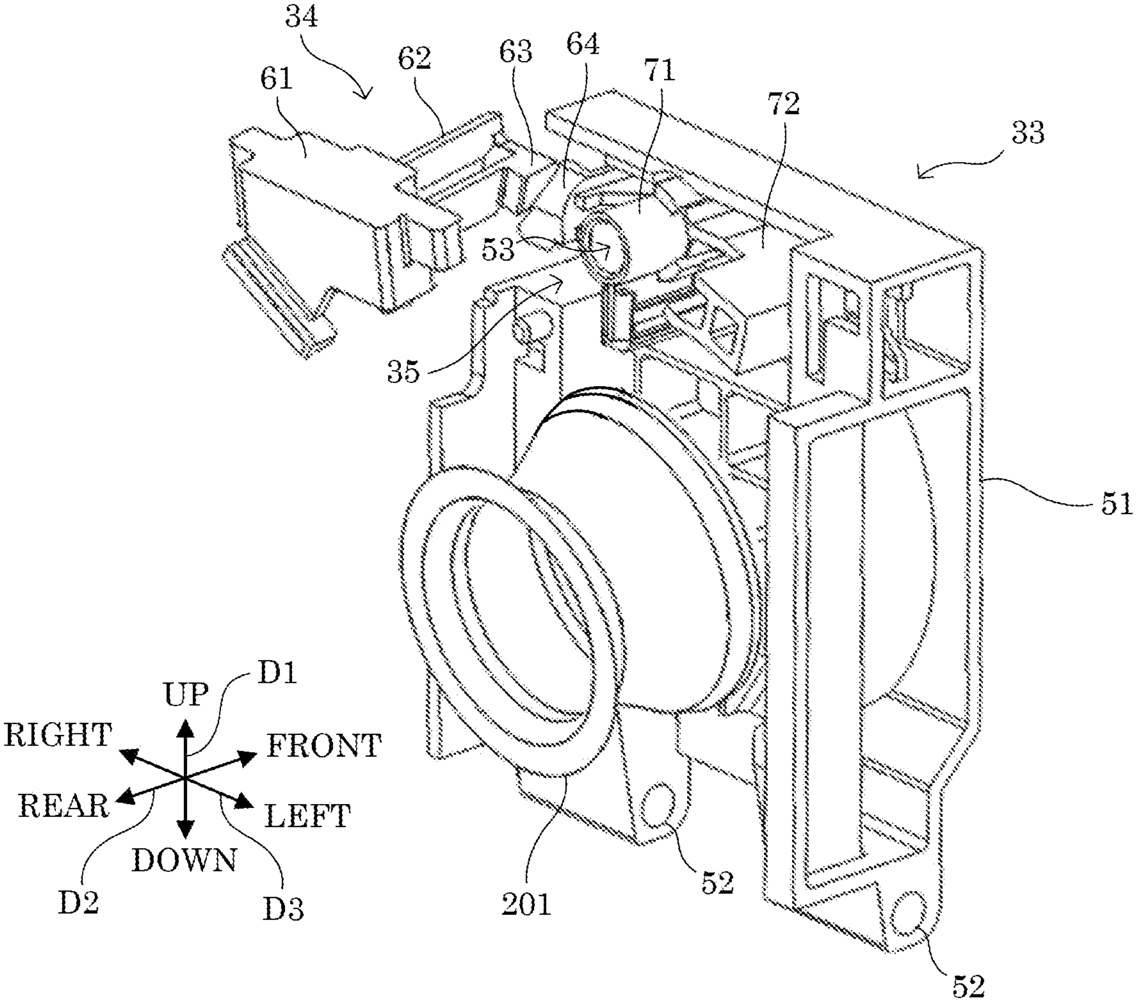
FIG. 7 is a perspective view showing a configuration in a periphery of a lock mechanism of the image forming apparatus according to the embodiment of the present invention.

As shown in FIG. 7, the toner replenishing portion 13 also includes a lock mechanism 34 and a lock release portion 35.

The toner containers 200 store toner to be replenished to the developing device 23. In the present embodiment, four toner containers 200 respectively corresponding to the respective colors of black, yellow, cyan, and magenta are provided in the toner replenishing portion 13. FIG. 2 shows only the yellow toner container 200, and illustrations of the toner containers 200 of other colors are omitted. FIG. 5 shows only the lock cover 33 and the lock mechanism 34 corresponding to the yellow toner container 200, and illustrations of the lock covers 33 and the lock mechanisms 34 corresponding to the toner containers 200 of other colors are omitted. The toner containers 200 of the respective colors have a common configuration except that an outer diameter of the black toner container 200 is larger than that of the toner containers 200 of other colors. Hereinafter, unless stated otherwise, descriptions will be given on the yellow toner container 200 shown in FIG. 2 and configurations corresponding to that toner container 200.

Figure 3:
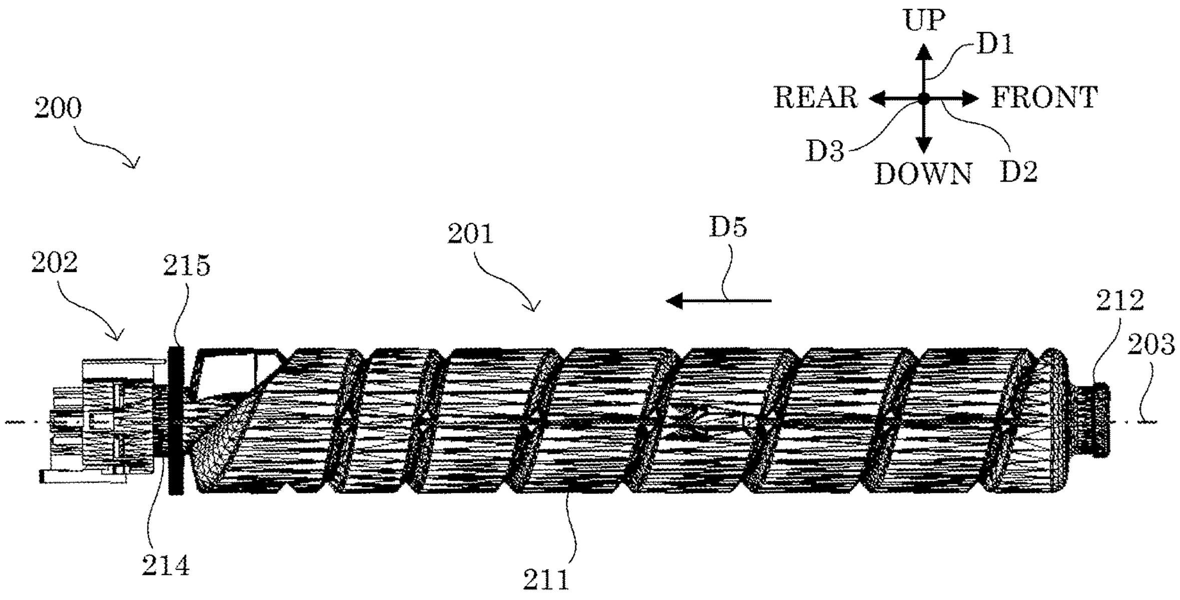
FIG. 3 is a side view showing a configuration of a toner container of the image forming apparatus according to the embodiment of the present invention.

As shown in FIG. 3, the toner container 200 includes a container body 201 and a cap portion 202 (an example of a guide portion of the present invention).

The container body 201 stores toner and conveys the toner along a conveying direction D5 (see FIG. 3). The conveying direction D5 is a direction from a front (front surface) to a back (back surface) of the image forming apparatus 100. The container body 201 is integrally formed by a synthetic resin such as polyethylene terephthalate (PET resin). For example, in the container body 201, a communication portion 214, a gear portion 215, and an opening portion 216 (see FIG. 4) are formed by injection molding. Also in the container body 201, a storage portion 211 and a grip portion 212 are formed by injection blow molding.

Figure 4:
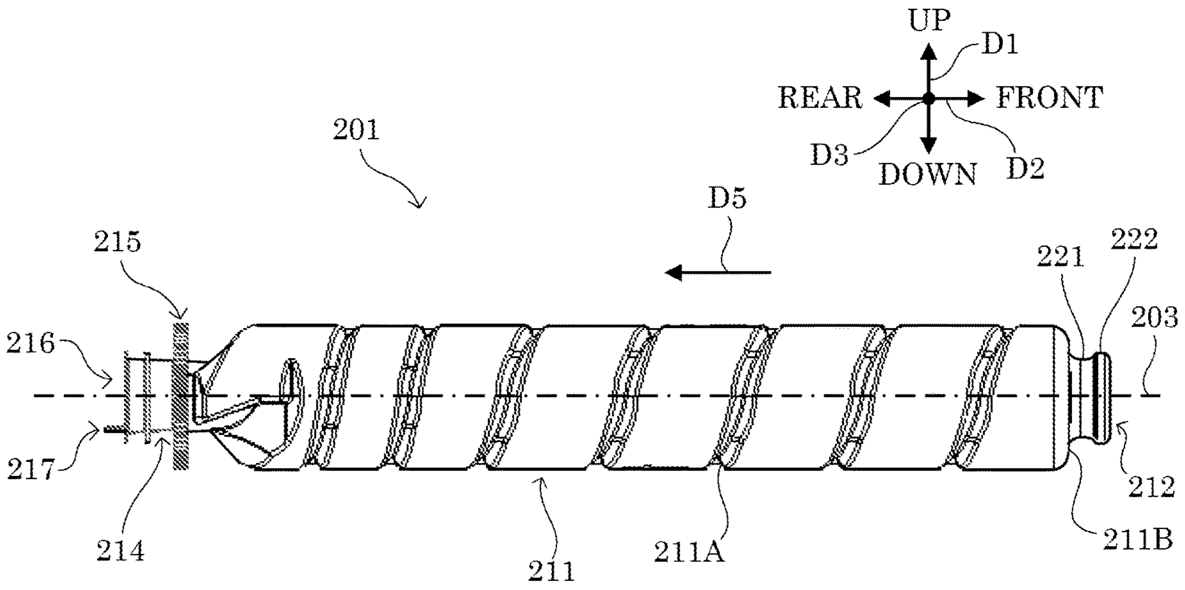
FIG. 4 is a side view showing a configuration of a container body of the image forming apparatus according to the embodiment of the present invention.

As shown in FIG. 4, the container body 201 includes the storage portion 211, the grip portion 212, the communication portion 214, the gear portion 215, and the opening portion 216.

The storage portion 211 is formed in a tubular shape that is concentric with a rotation shaft 203 (see FIG. 3 and FIG. 4) of the toner container 200. Specifically, the storage portion 211 is formed in a cylindrical shape. Toner for replenishment is stored inside the storage portion 211.

In the toner container 200, the container body 201 is provided while being rotatable about the rotation shaft 203. A protrusion portion 211A (see FIG. 4) spirally formed along the rotation shaft 203 is provided at an inner circumferential portion of the storage portion 211. FIG. 4 shows a spiral concave portion formed at an outer circumferential portion of the storage portion 211 in correspondence with the protrusion portion 211A. Since the spiral protrusion portion 211A is formed inside the storage portion 211, by causing the storage portion 211 to rotate in a first direction D6 (an example of a specific direction of the present invention) about the rotation shaft 203, the toner stored inside can be conveyed in the conveying direction D5 along the rotation shaft 203.

The grip portion 212 is provided at an end portion of the container body 201 on an upstream side of the conveying direction D5. The grip portion 212 is a portion that is gripped by a hand of a user when the toner container 200 is drawn out from the insertion slot portion 31 (see FIG. 2 and FIG. 5) in the front direction. The toner container 200 is inserted into the insertion slot portion 31 with a tip end portion thereof in the conveying direction D5 at the front.

As shown in FIG. 4, the grip portion 212 is provided so as to protrude from an end surface 211B of the storage portion 211 on the upstream side of the conveying direction D5 toward the upstream side of the conveying direction D5. Specifically, the grip portion 212 is provided so as to protrude in a cylindrical shape concentric with the rotation shaft 203 from the end surface 211B. The grip portion 212 is formed to be hollow inside, and an internal space thereof is in communication with the storage portion 211. Toner for replenishment is stored inside the grip portion 212.

The grip portion 212 is formed such that a protrusion tip end portion thereof widens more in a radial direction orthogonal to the rotation shaft 203 than a protrusion base end portion thereof. Specifically, the grip portion 212 includes a small-diameter portion 221 and a large-diameter portion 222 as shown in FIG. 4. The small-diameter portion 221 is formed on the protrusion base end portion side of the grip portion 212. The large-diameter portion 222 is formed on the protrusion tip end portion side of the grip portion 212. The large-diameter portion 222 is provided adjacent to the small-diameter portion 221. The large-diameter portion 222 has a larger diameter than the small-diameter portion 221. Since the grip portion 212 is formed as described above, the user can hook a finger on the large-diameter portion 222 to thus draw out the toner container 200 from the insertion slot portion 31. It is noted that the size of the grip portion 212 in the radial direction may widen stepwise in an arbitrary number of steps from the protrusion base end portion to the protrusion tip end portion. Alternatively, the size of the grip portion 212 in the radial direction may widen consecutively from the protrusion base end portion to the protrusion tip end portion.

The opening portion 216 is provided at an end portion of the container body 201 on the downstream side of the conveying direction D5. The opening portion 216 is opened toward the conveying direction D5 along the rotation shaft

203. Toner stored inside the container body 201 is discharged from the opening portion 216 in the conveying direction D5.

The communication portion 214 is provided to extend in a tubular shape concentric with the rotation shaft 203 from an end portion of the storage portion 211 on the downstream side of the conveying direction D5 toward the conveying direction D5. Specifically, as shown in FIG. 4, the communication portion 214 is formed in a tubular shape having a smaller diameter than the storage portion 211. The communication portion 214 causes the internal space of the storage portion 211 and the opening portion 216 to communicate with each other. The opening portion 216 is formed to have the same size as an end portion of the communication portion 214 on the downstream side of the conveying direction D5. It can also be said that the opening portion 216 is the end portion of the communication portion 214 on the downstream side of the conveying direction D5.

The gear portion 215 is provided at an outer circumferential portion 241 (see FIG. 13) of the communication portion 214. The gear portion 215 receives a rotational driving force supplied from the drive portion 32. In the container body 201, the respective configurations including the gear portion 215 are formed integrally. Therefore, as the gear portion 215 receives the rotational driving force supplied from the drive portion 32, the container body 201 rotates about the rotation shaft 203.

The cap portion 202 is attached to a rear end portion of the container body 201, that is, the opening portion 216. The cap portion 202 is formed to have a size with which the communication portion 214 including the opening portion 216 can be partially covered, and is formed in a tubular shape that is opened in one direction.

The cap portion 202 downwardly guides the toner discharged from the opening portion 216 at a position more on the downstream side of the conveying direction D5 than the opening portion 216. A guide space 202A (see FIG. 22) that downwardly guides the toner discharged from the opening portion 216 is formed inside the cap portion 202. The guide space 202A is formed by an inner circumferential portion of the cap portion 202 and an inner wall surface opposing the opening portion 216. Inside the cap portion 202, gaps formed between the opening portion 216 and the cap portion 202 are filled by sealing members 202B (see FIG. 22). At a bottom portion of the inner circumferential portion of the cap portion 202, a discharge outlet 202C (see FIG. 22) from which the toner is discharged to the outside of the cap portion 202 is formed.

The toner container 200 is attached to the attachment portion 30. The attachment portion 30 is provided in correspondence with each of the toner containers 200. The attachment portion 30 forms a storage space of the toner container 200, that extends in the front-rear direction D2, inside the housing 14. The toner container 200 is attached to the attachment portion 30 in an attitude in which the rotation shaft 203 is disposed along the horizontal plane.

The insertion slot portion 31 is provided on a side surface of the housing 14 of the image forming apparatus 100. Specifically, the insertion slot portion 31 is provided on a front side (front surface) of the housing 14. On the front side of the housing 14, a lock frame 14A (see FIG. 5) elongated in the left-right direction D3 is provided. The insertion slot portion 31 is formed in the lock frame 14A. The insertion slot portion 31 is provided in correspondence with each of the attachment portions 30. The insertion slot portion 31 is positioned at a front end portion of the attachment portion 30 and is in communication with the attachment portion 30. The toner container 200 is inserted into the insertion slot portion 31.

The drive portion 32 causes the container body 201 of the toner container 200 to rotate. The drive portion 32 is provided in correspondence with each of the attachment portions 30. The drive portion 32 is provided at a rear end portion of the attachment portion 30 (see FIG. 2).

Figure 6:
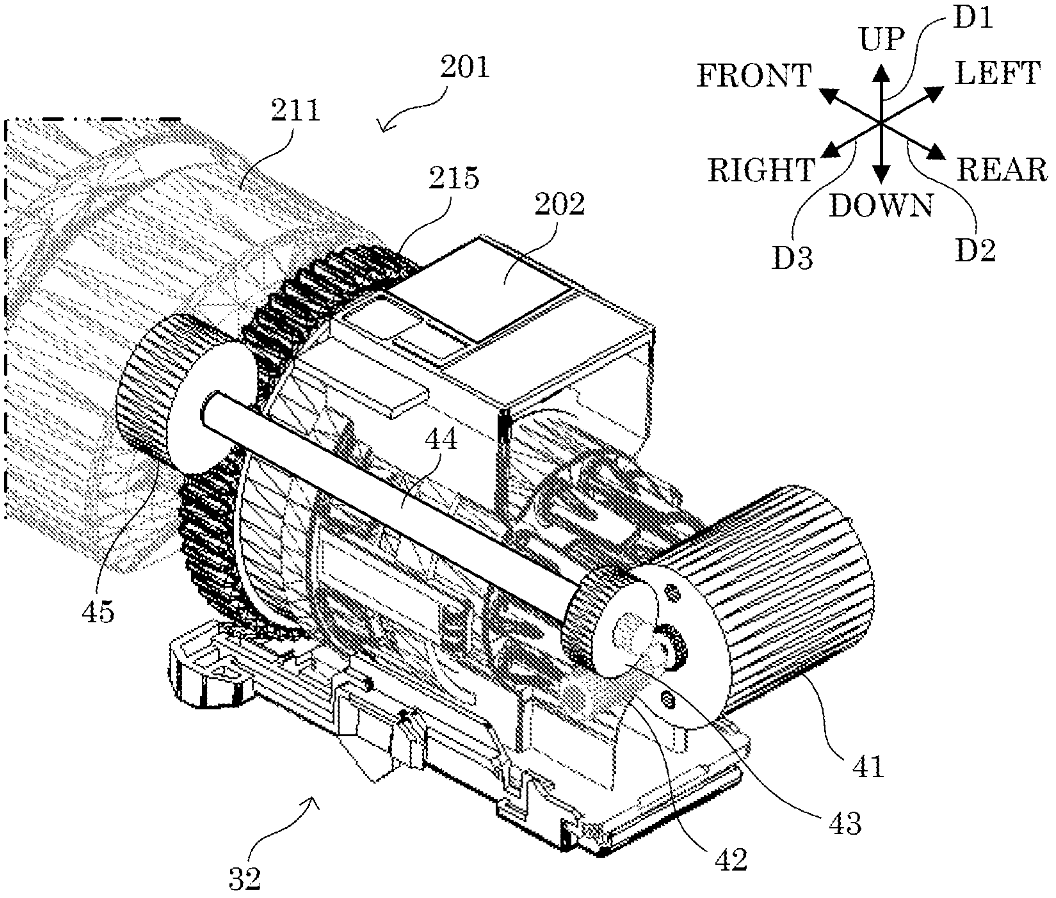
FIG. 6 is a perspective view showing a configuration of a drive portion of the image forming apparatus according to the embodiment of the present invention.

As shown in FIG. 6, the drive portion 32 includes a motor 41, a first gear 42, a second gear 43, a shaft 44, and a third gear 45. The first gear 42 is fixed to a drive shaft of the motor 41. The second gear 43 is fixed to one end portion of the shaft 44 and intermeshes with the first gear 42. The shaft 44 is rotatably supported by a bearing (not shown) provided inside the housing 14. The third gear 45 is fixed to the other end portion of the shaft 44 and intermeshes with the gear portion 215 of the container body 201.

In the drive portion 32, a rotational driving force generated by the motor 41 is transmitted to the gear portion 215 via the first gear 42, the second gear 43, the shaft 44, and the third gear 45. Thus, the container body 201 rotates about the rotation shaft 203.

The lock cover 33 is used to open and close the insertion slot portion 31. The lock cover 33 is provided in correspondence with each of the insertion slot portions 31. As shown in FIG. 5, the lock cover 33 is provided on the front side of the lock frame 14A.

As shown in FIG. 7, the lock cover 33 includes a plate-like portion 51, bearing portions 52, and a pivot shaft 53. The plate-like portion 51 functions as a cover that covers the insertion slot portion 31. The bearing portions 52 support the lock cover 33 such that the lock cover 33 is openable and closable. The bearing portions 52 are provided at a lower portion of the plate-like portion 51, and a rotation shaft is inserted thereinto along the left-right direction D3. The rotation shaft is fixed at the lower portion of the lock frame 14A. Thus, the lock cover 33 rotates about the rotation shaft so as to be capable of shifting a state between a closed state where the insertion slot portion 31 is closed and an opened state where the insertion slot portion 31 is opened. The pivot shaft 53 is provided so as to protrude from an inner surface (reverse side) of the plate-like portion 51 along the front-rear direction D2 (see FIG. 9 and FIG. 10).

The lock mechanism 34 restricts the shift of the state of the lock cover 33 from the closed state to the opened state. The lock mechanism 34 is provided in correspondence with each of the lock covers 33. As shown in FIG. 5, the lock mechanism 34 is provided at an upper portion of the lock frame 14A.

Figure 8:
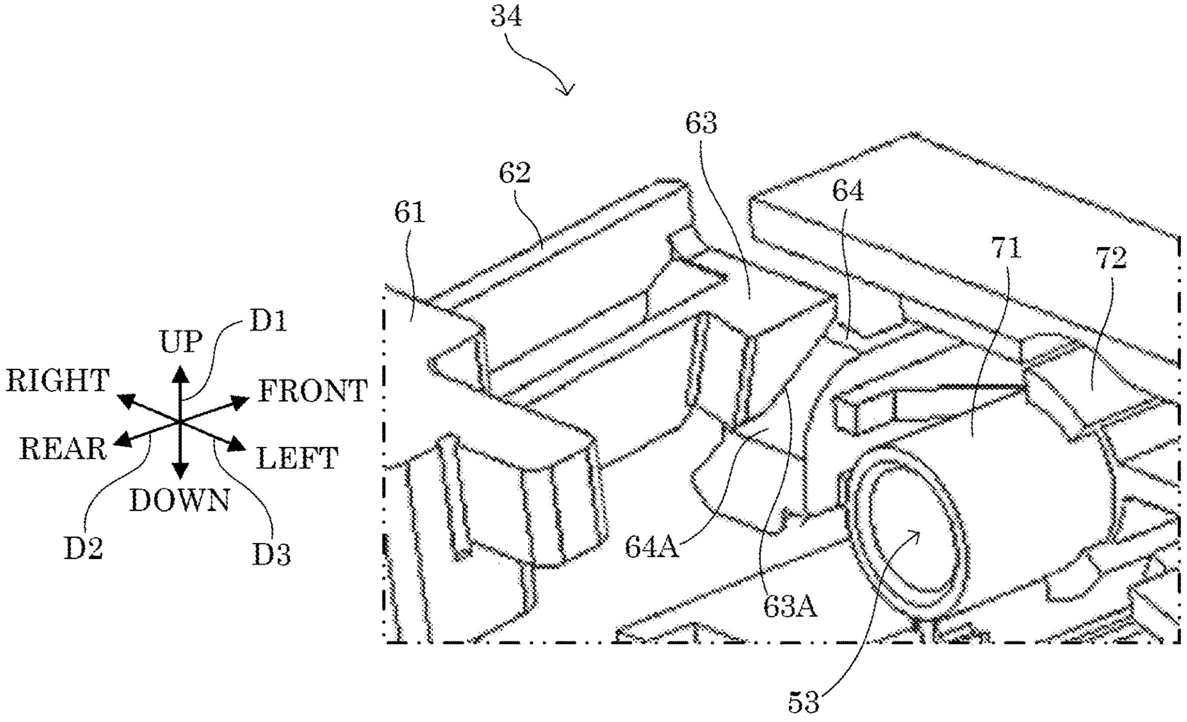
FIG. 8 is a perspective view showing the configuration in the periphery of the lock mechanism of the image forming apparatus according to the embodiment of the present invention.

As shown in FIG. 7, the lock mechanism 34 includes an arm support portion 61, an arm portion 62, an engagement portion 63, and a to-be-engaged portion 64. The arm support portion 61 is fixed at an upper portion of the lock frame 14A. The arm portion 62 is provided so as to protrude in the front direction from the arm support portion 61. The engagement portion 63 is provided so as to protrude in the leftward direction from a tip end of the arm portion 62 in a protrusion direction. As shown in FIG. 8, the engagement portion 63 includes a tilted surface 63A facing an oblique lower front direction. The tilted surface 63A is formed to tilt downwardly from a front end portion to a rear end portion in the engagement portion 63. The to-be-engaged portion 64 is provided to be capable of rocking about the pivot shaft 53 of the lock cover 33. The to-be-engaged portion 64 is formed to be capable of engaging with the engagement portion 63. As shown in FIG. 8, the to-be-engaged portion 64 includes a tilted surface 64A. When the lock cover 33 is in the closed state, the tilted surface 64A faces an oblique upper rear direction. When the state of the lock cover 33 shifts from the opened state to the closed state, the tilted surface 64A comes into contact with the tilted surface 63A of the engagement portion 63 to thus cause the to-be-engaged portion 64 to rock downwardly. Thus, the to-be-engaged portion 64 is guided to a rear side of the engagement portion 63, and the engagement portion 63 engages with the to-be-engaged portion 64. By the engagement of the engagement portion 63 and the to-be-engaged portion 64, the shift of the state of the lock cover 33 from the closed state to the opened state is restricted.

The lock release portion 35 cancels the restriction on the shift of the state of the lock cover 33 by the lock mechanism 34. The lock release portion 35 is provided in correspondence with each of the lock mechanisms 34. The lock release portion 35 is provided on the inner surface (reverse side) of the plate-like portion 51 in the lock cover 33.

Figure 9:
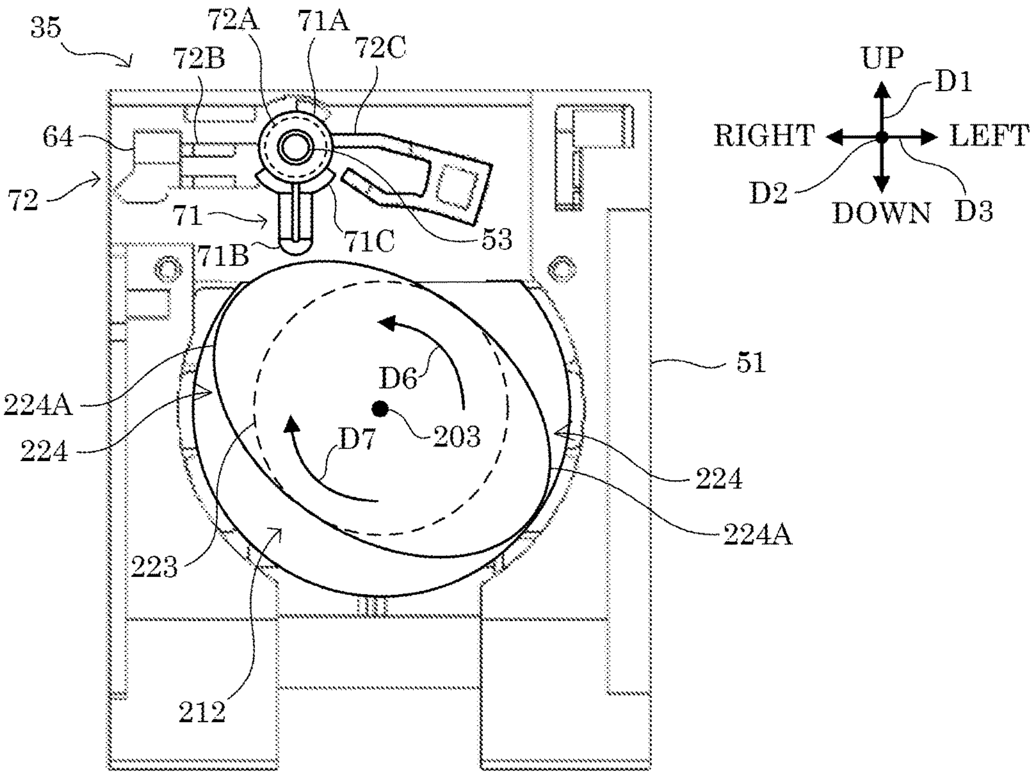
FIG. 9 is a back view showing a configuration of a lock release portion of the image forming apparatus according to the embodiment of the present invention.
Figure 10:
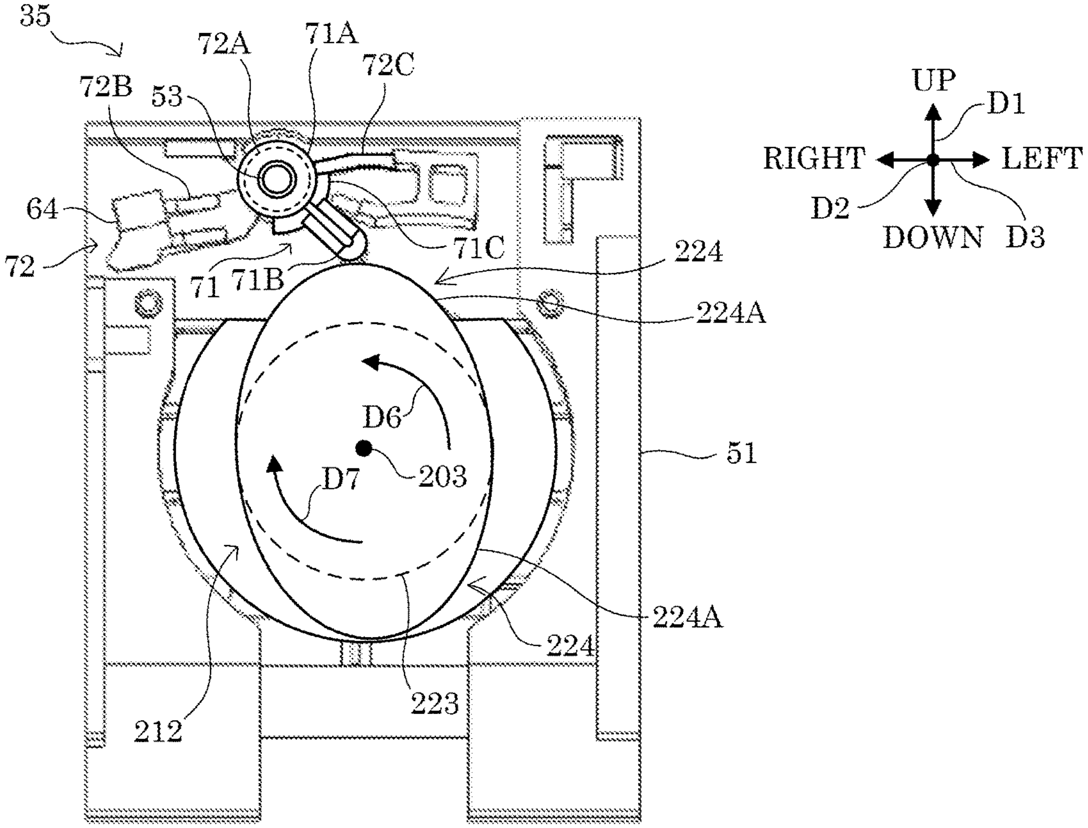
FIG. 10 is a back view showing the configuration of the lock release portion of the image forming apparatus according to the embodiment of the present invention.

As shown in FIG. 7 and FIG. 9, the lock release portion 35 includes a first lever portion 71 and a second lever portion 72. The first lever portion 71 extends from the pivot shaft 53 (see FIG. 9) parallel to the rotation shaft 203 toward the rotation shaft 203 side, and an extension base end portion thereof is supported by the pivot shaft 53 so as to be capable of rocking. As shown in FIG. 9, the first lever portion 71 is provided to extend from the pivot shaft 53 toward the grip portion 212. As shown in FIG. 9, the first lever portion 71 includes a bearing portion 71A that is inserted into the pivot shaft 53, an extension portion 71B that extends from the bearing portion 71A in a direction orthogonal to the pivot shaft 53, and a pressing portion 71C that is provided on a left side of the extension portion 71B. The second lever portion 72 is provided to be capable of rocking about the pivot shaft 53 and supports the to-be-engaged portion 64. The second lever portion 72 is provided between the first lever portion 71 and the inner surface (reverse side) of the plate-like portion 51. As shown in FIG. 9, the second lever portion 72 includes a bearing portion 72A that is inserted into the pivot shaft 53, a support portion 72B that extends from the bearing portion 72A in the rightward direction and supports the to-be-engaged portion 64, and a to-be-pressed portion 72C that extends from the bearing portion 72A in the leftward direction.

The lock release portion 35 cancels the restriction on the shift of the state of the lock cover 33 by the lock mechanism 34 in accordance with the rocking of the first lever portion 71 in a second direction D7 (see FIG. 9) opposite to the first direction D6.

Specifically, the extension portion 71B of the first lever portion 71 is provided to be capable of coming into contact with the grip portion 212 of the toner container 200 attached to the attachment portion 30. As the container body 201 rotates in the second direction D7, the first lever portion 71 comes into contact with the grip portion 212 and rocks toward the second direction D7 side. Thus, the pressing portion 71C of the first lever portion 71 presses the to-be-pressed portion 72C of the second lever portion 72 upwardly, and the support portion 72B of the second lever portion 72 and the to-be-engaged portion 64 rock downwardly, so that the engagement between the engagement portion 63 and the to-be-engaged portion 64 is released. In other words, the lock by the lock mechanism 34 is released. It is noted that when the container body 201 rotates in the first direction D6, the first lever portion 71 comes into contact with the grip portion 212 and rocks toward the first direction D6 side, but the second lever portion 72 does not move in an interlocking manner with the rocking of the first lever portion 71. Therefore, even when the container body 201 is rotated in the first direction D6, the lock by the lock mechanism 34 is not released.

Incidentally, there is known, as the related art, an image forming apparatus including a protrusion portion which is provided on an outer circumferential surface of the grip portion 212, protrudes from the outer circumferential surface toward an outer side of the radial direction, and rotates integrally with the storage portion 211 to come into contact with the first lever portion 71.

However, in the image forming apparatus according to the related art described above, since the protrusion portion is provided so as to protrude from the outer circumferential surface of the grip portion 212 toward the outer side of the radial direction, hitting sounds are generated when the protrusion portion and the first lever portion 71 come into contact with each other.

In contrast, in the image forming apparatus 100 according to the embodiment of the present invention, it is possible to suppress hitting sounds generated during the drive of the toner container 200 as will be described below.

[Configuration of container body 201] Hereinafter, the container body 201 will be described with reference to FIG. 11 to FIG. 23.

The grip portion 212 includes a contact portion 224 that rotates integrally with the storage portion 211 and comes into contact with the first lever portion 71. The contact portion 224 is provided at the outer circumferential portion of the grip portion 212.

Specifically, the contact portion 224 includes a curved surface 224A that is curved and passes, from a first position P1 (see FIG. 12) in a reference circle 223 (see FIG. 9 and FIG. 12) that is concentric with the rotation shaft 203 and does not intersect with the first lever portion 71 toward a second position P2 (see FIG. 12) opposing the first position P1 with the rotation shaft 203 interposed therebetween in the reference circle 223, an outer side of the reference circle 223. The curved surface 224A is formed to be capable of intersecting with the first lever portion 71, that is, coming into contact with the first lever portion 71.

Figure 11:
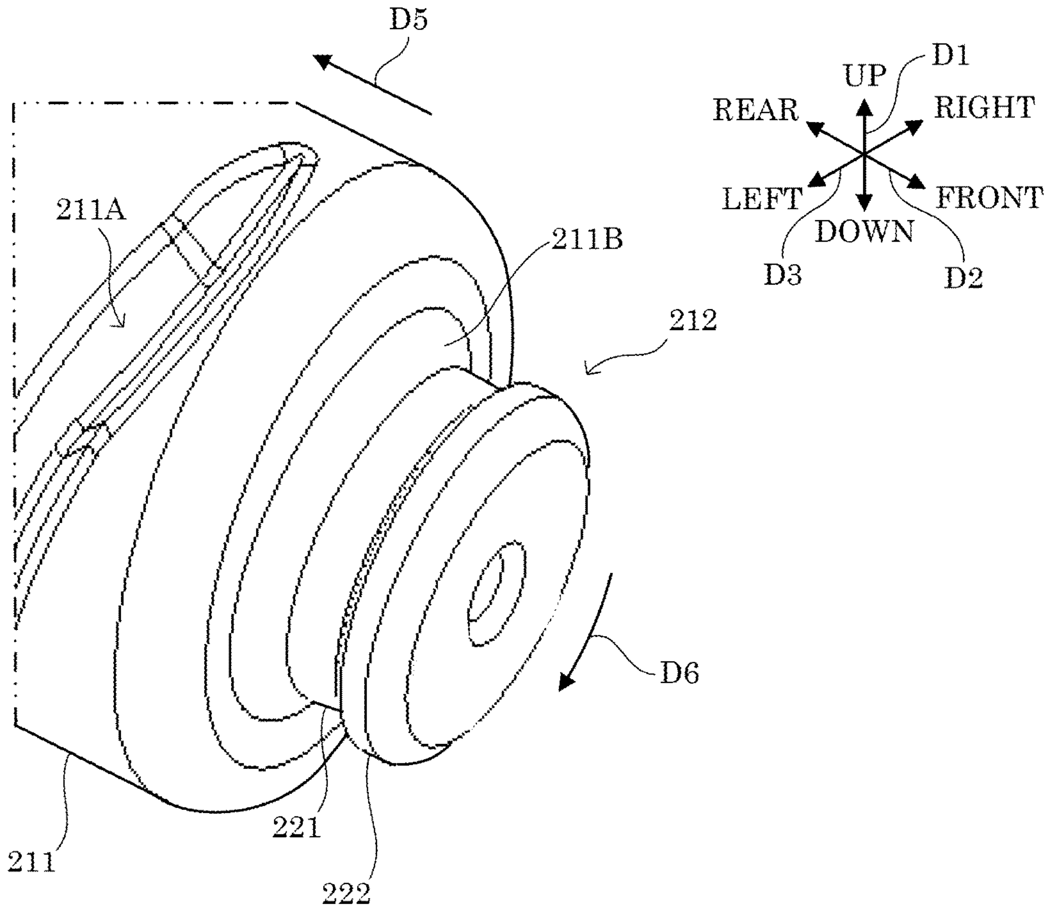
FIG. 11 is a perspective view showing a configuration of a grip portion of the image forming apparatus according to the embodiment of the present invention.
Figure 12:
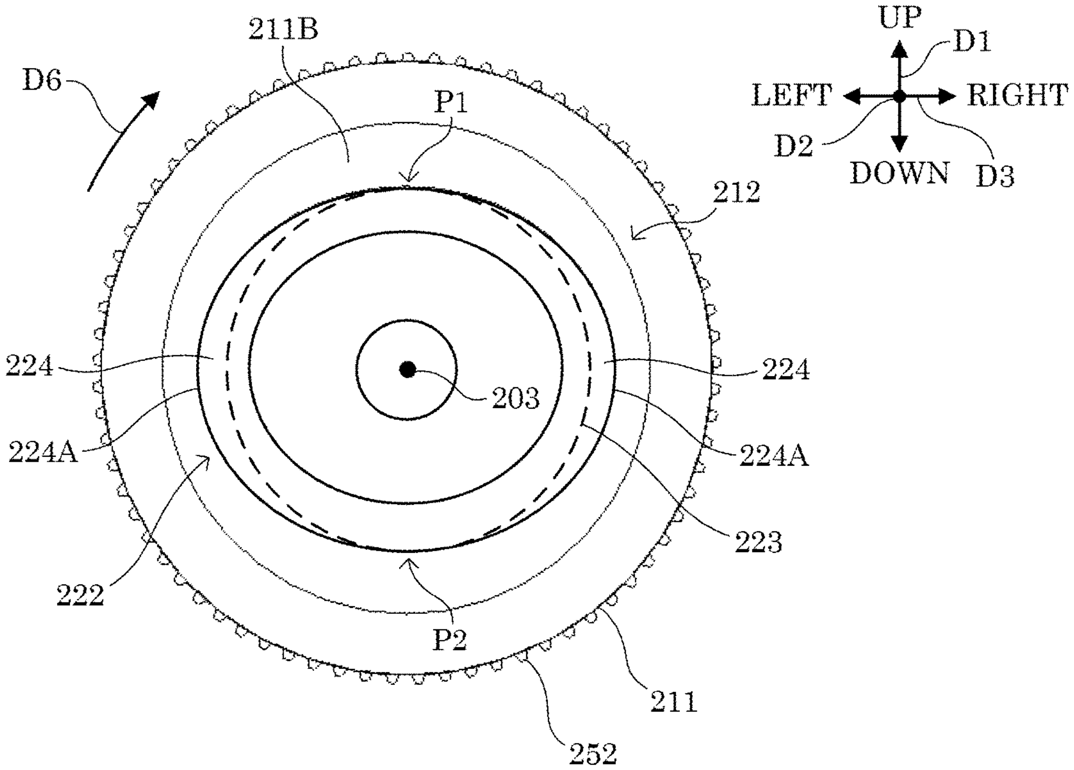
FIG. 12 is a front view showing the configuration of the grip portion of the image forming apparatus according to the embodiment of the present invention.

As shown in FIG. 11 and FIG. 12, the large-diameter portion 222 of the grip portion 212 is formed in an elliptic columnar shape that is concentric with the rotation shaft 203. The contact portion 224 is a portion swelled from the reference circle 223, that is included in the large-diameter portion 222. In other words, a pair of contact portions 224 opposing each other with the rotation shaft 203 interposed therebetween are provided in the large-diameter portion 222. It is noted that similar to the large-diameter portion 222, the small-diameter portion 221 of the grip portion 212 is also formed in an elliptic columnar shape.

By providing the contact portions 224 as described above, a contact surface with the first lever portion 71, that is provided at the outer circumferential portion of the grip portion 212, can be laid as much as possible. Thus, hitting sounds generated when the contact portion 224 and the first lever portion 71 come into contact with each other can be suppressed. Therefore, in the image forming apparatus 100, it is possible to suppress hitting sounds generated during the drive of the toner container 200.

It is noted that the number of contact portions 224 to be provided at the outer circumferential portion of the grip portion 212 may be one or three or more. In this case, the small-diameter portion 221 may be formed in a shape that is similar to that of the large-diameter portion 222 including the contact portion 224, or may be formed in a cylindrical shape. Alternatively, the grip portion 212 may be formed without the size thereof in the radial direction expanding from the protrusion base end portion toward the protrusion tip end portion. Alternatively, the contact portion 224 may be provided at the outer circumferential portion of the storage portion 211.

Incidentally, there is known, as the related art, a developer storage container in which an end portion of the storage portion 211 on the downstream side of the conveying direction D5 is tapered down and connected to the communication portion 214, and the protrusion portion 211A is formed up to a connection portion with the communication portion 214 along the conveying direction D5, so that toner inside the storage portion 211 is guided to the communication portion 214.

However, in the developer storage container according to the related art described above, a conveying force imparted to the toner by the protrusion portion 211A formed at the connection portion is weak, so the toner remains in the communication portion 214 at a time of the replacement of the container.

Further, also when a configuration for conveying toner is not provided in the communication portion 214, toner remains in the communication portion 214 at the time of the replacement of the developer storage container.

In contrast, in the image forming apparatus 100 according to the embodiment of the present invention, it is possible to reduce toner that remains in the toner container 200 at the time of the replacement of the container as will be described below.

Figure 13:
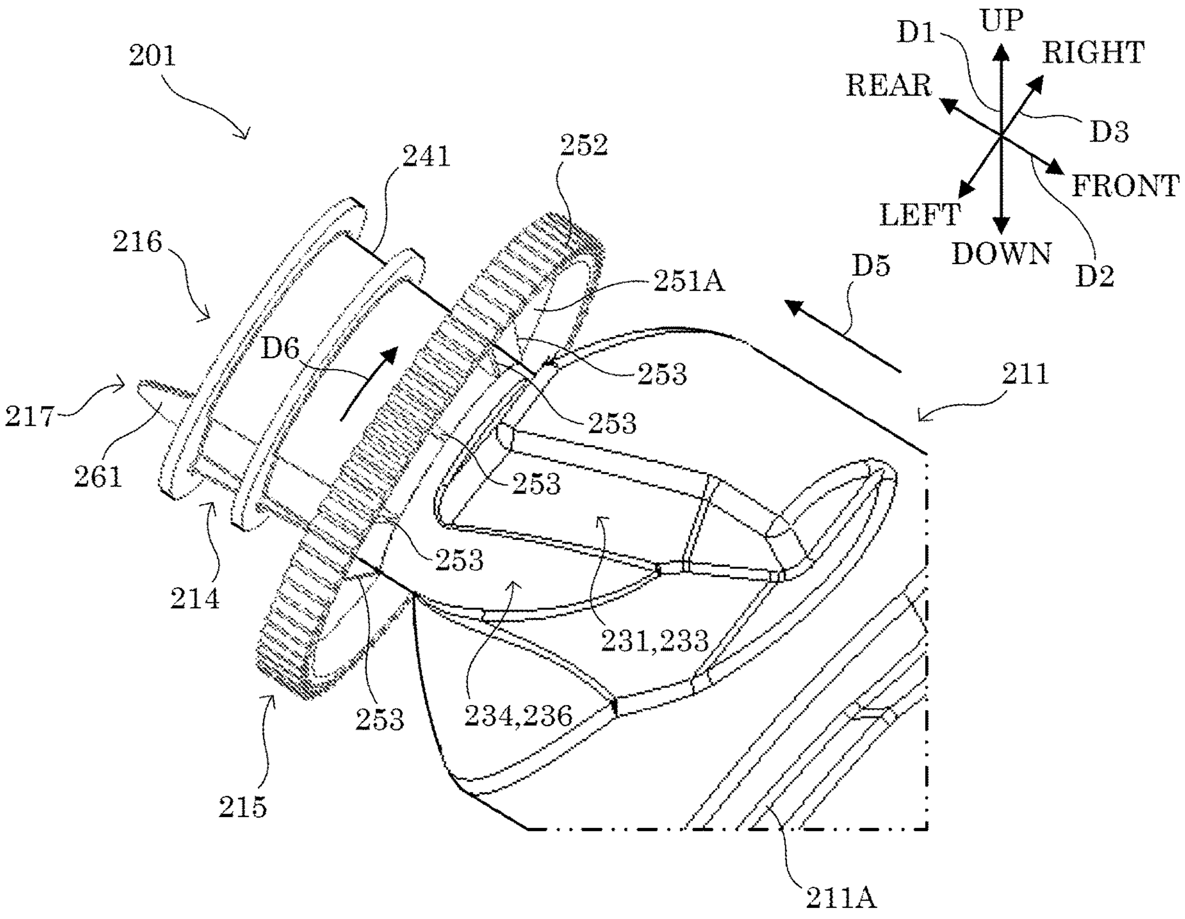
FIG. 13 is a perspective view showing a configuration of a drawing portion of the image forming apparatus according to the embodiment of the present invention.
Figure 14:
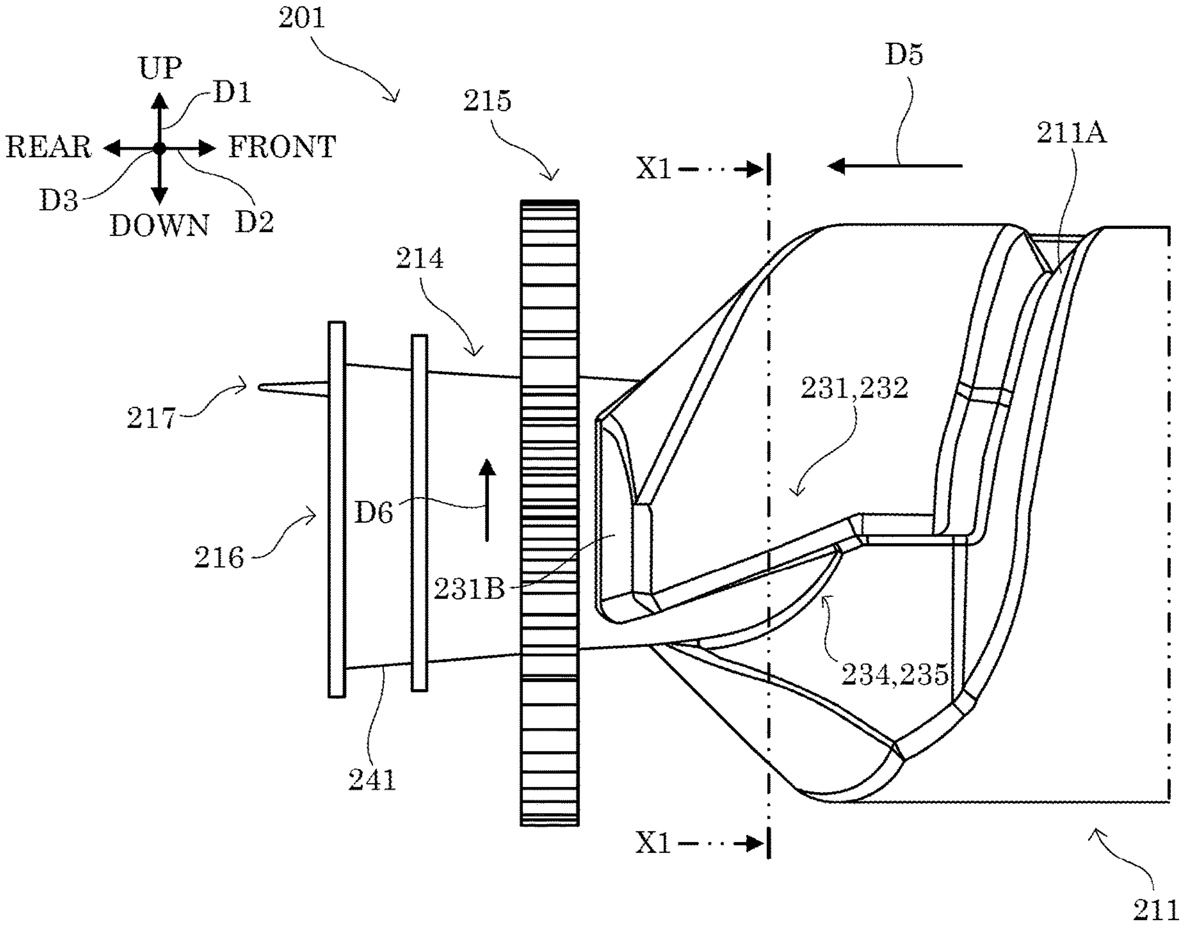
FIG. 14 is a side view showing the configuration of the drawing portion of the image forming apparatus according to the embodiment of the present invention.

Specifically, as shown in FIG. 13 and FIG. 14, a drawing portion 231 and a guide portion 234 are provided at the end portion of the storage portion 211 on the downstream side of the conveying direction D5. Further, the communication portion 214 is formed in a tapered shape in which the inner circumferential portion thereof widens in the radial direction along the conveying direction D5 (see FIG. 21). Hereinafter, these features will be described in order.

The drawing portion 231 includes a drawing surface 231A (see FIG. 14 and FIG. 15) that faces the first direction D6 at a position more on the outer side of the radial direction than the communication portion 214, at the end portion of the storage portion 211 on the downstream side of the conveying direction D5. The drawing portion 231 draws toner in contact with the drawing surface 231A in accordance with the rotation of the storage portion 211 in the first direction D6. It is noted that in FIG. 15, an end portion 242A of an inner circumferential portion 242 of the communication portion 214 on the upstream side of the conveying direction D5 is indicated by a broken line.

As shown in FIG. 14, the drawing surface 231A is formed to tilt toward the upstream side of the first direction D6 along the conveying direction D5. Thus, toner drawn by the drawing surface 231A is guided toward the downstream side of the conveying direction D5.

The drawing portion 231 includes a wall portion 231B (see FIG. 14 and FIG. 16) that is erected in the first direction D6 at an end portion of the drawing surface 231A on the downstream side of the conveying direction D5, and in which an end portion on the inner side of the radial direction is tilted more toward the conveying direction D5 side than an end portion on the outer side of the radial direction. The wall portion 231B guides the toner drawn by the drawing surface 231A toward the inner side of the radial direction, that is, toward the communication portion 214 side.

The guide portion 234 guides the toner drawn by the drawing portion 231 to the communication portion 214. Specifically, the guide portion 234 guides, to the communication portion 214, toner that has slipped from the drawing surface 231A that is tilted downwardly toward the inner side of the radial direction along with the rotation of the storage portion 211 in the first direction D6.

As shown in FIG. 13 to FIG. 16, the guide portion 234 is provided to be continuous with the drawing surface 231A and the inner circumferential surface of the communication portion 214 at a position more on the inner side of the radial direction than the drawing portion 231.

Figure 15:
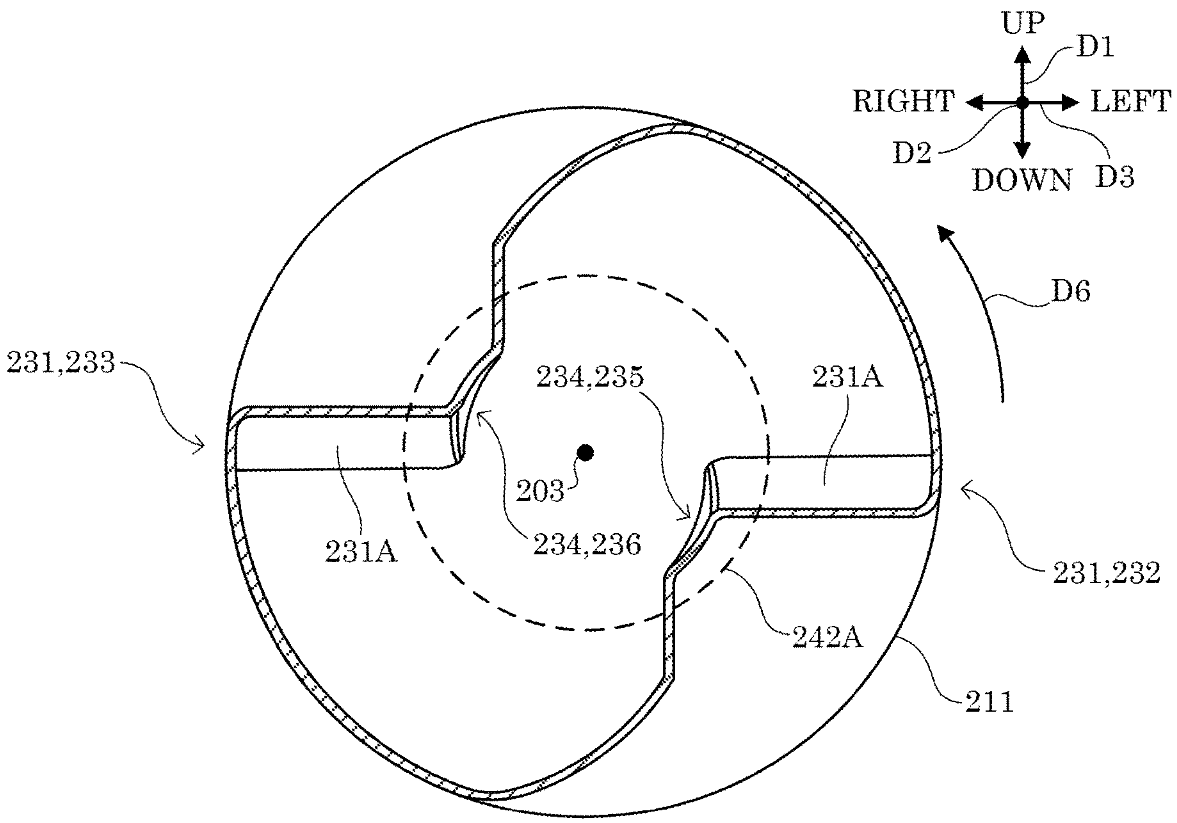
FIG. 15 is a cross-sectional view taken along the line X1-X1 indicated by arrows in FIG. 14.

As shown in FIG. 14 and FIG. 15, the guide portion 234 is formed to tilt from the end portion of the drawing surface 231A on the inner side of the radial direction along the inner circumferential surface of the communication portion 214.

Figure 16:
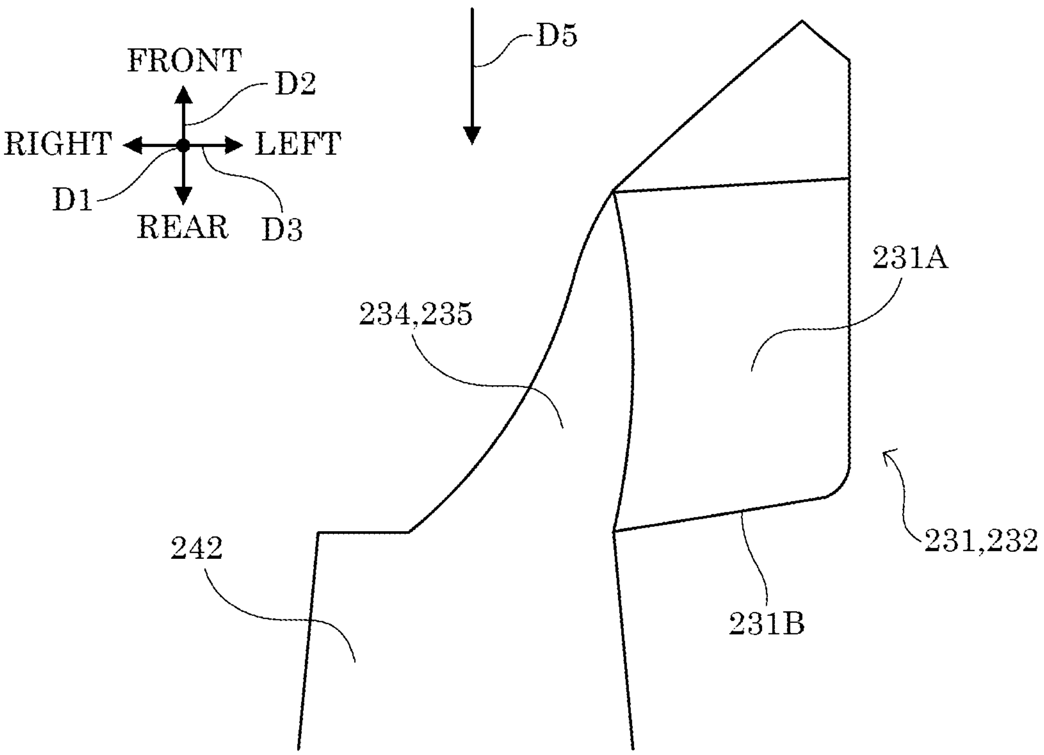
FIG. 16 is a plan view showing the configuration of the drawing portion of the image forming apparatus according to the embodiment of the present invention.

As shown in FIG. 16, the guide portion 234 is formed to widen from the end portion of the drawing surface 231A on the upstream side of the conveying direction D5 toward the communication portion 214.

The storage portion 211 includes a pair of drawing portions 231 (see FIG. 15) opposing each other with the rotation shaft 203 interposed therebetween. Of the pair of drawing portions 231, a first drawing portion 232 is provided to be continuous with the end portion of the protrusion portion 211A on the downstream side of the conveying direction D5 (see FIG. 14). In addition, of the pair of drawing portions 231, a second drawing portion 233 is not continuous with the protrusion portion 211A of the storage portion 211 (see FIG. 13).

Further, the storage portion 211 includes a pair of guide portions 234 (see FIG. 15) corresponding to the pair of drawing portions 231. Of the pair of guide portions 234, a first guide portion 235 is provided in correspondence with the first drawing portion 232. Furthermore, of the pair of guide portions 234, a second guide portion 236 is provided in correspondence with the second drawing portion 233.

By providing the drawing portions 231 and the guide portions 234 described above, it becomes possible to cause toner inside the storage portion 211 to slip from a position on an upper side of the rotation shaft 203 toward the communication portion 214. Thus, toner can be conveyed to the communication portion 214 with a stronger conveying force than in the configuration for conveying toner to the communication portion 214 using the protrusion portion 211A formed up to the connection portion with the communication portion 214. Therefore, it is possible to reduce toner that remains in the toner container 200 at the time of the replacement of the container.

It is noted that the number of drawing portions 231 to be provided in the storage portion 211 may be three or more. In this case, the guide portion 234 only needs to be provided in correspondence with the number of drawing portions 231. Moreover, the drawing portion 231 to be provided in the storage portion 211 may be either one of the first drawing portion 232 and the second drawing portion 233.

Further, the guide portion 234 may be formed to widen from a position more on the downstream side of the conveying direction D5 than the end portion of the drawing surface 231A on the upstream side of the conveying direction D5 toward the communication portion 214. Furthermore, regarding the wall portion 231B, the end portion on the inner side of the radial direction does not need to tilt more toward the conveying direction D5 side than the end portion on the outer side of the radial direction. Moreover, the drawing surface 231A does not need to tilt toward the upstream side of the first direction D6 along the conveying direction D5.

Figure 21:
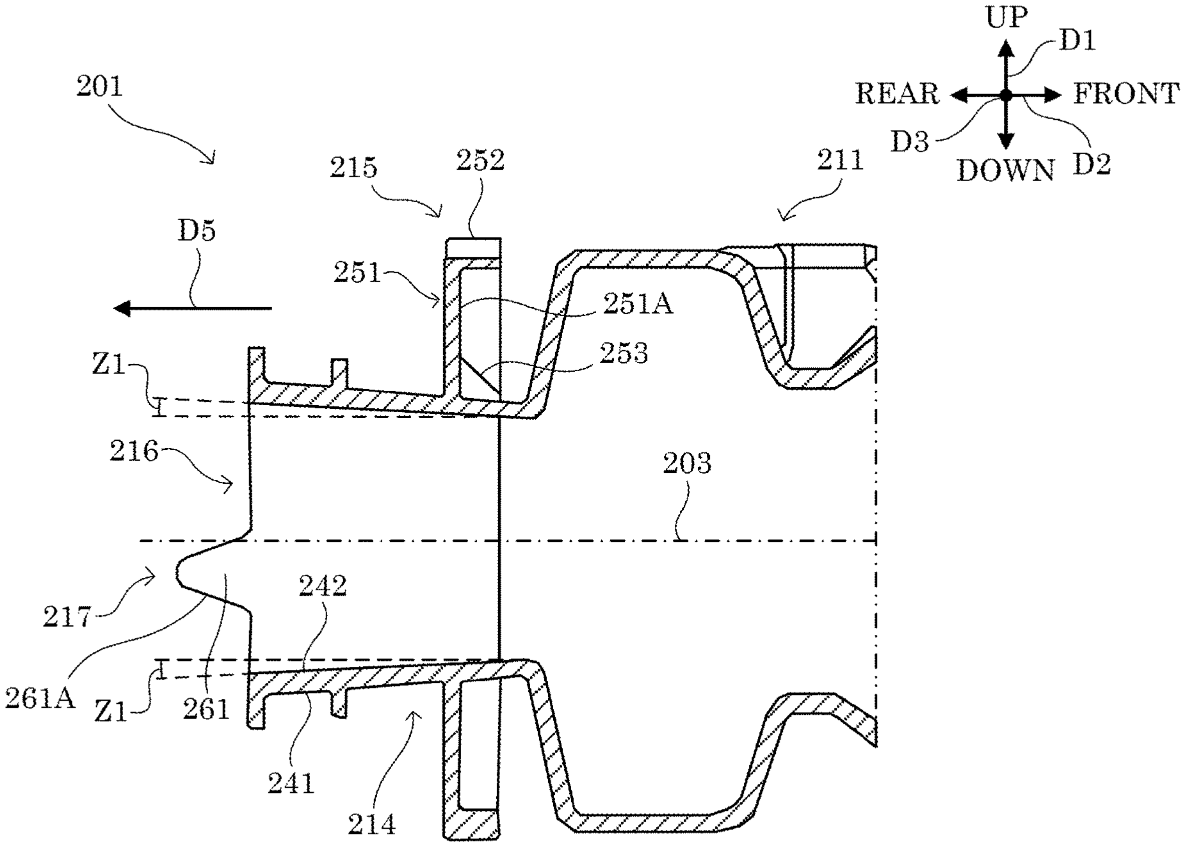
FIG. 21 is a cross-sectional view showing the configuration in the periphery of the communication portion of the image forming apparatus according to the embodiment of the present invention.

As shown in FIG. 21, the inner circumferential portion 242 of the communication portion 214 is formed to tilt toward the outer side of the radial direction at a specific angle Z1 along the conveying direction D5. For example, the specific angle Z1 is an angle set arbitrarily within a range up to 10 degrees.

Further, the communication portion 214 includes ridge portions 243 (see FIG. 18) formed along the rotation shaft 203 at the inner circumferential portion 242.

Figure 18:
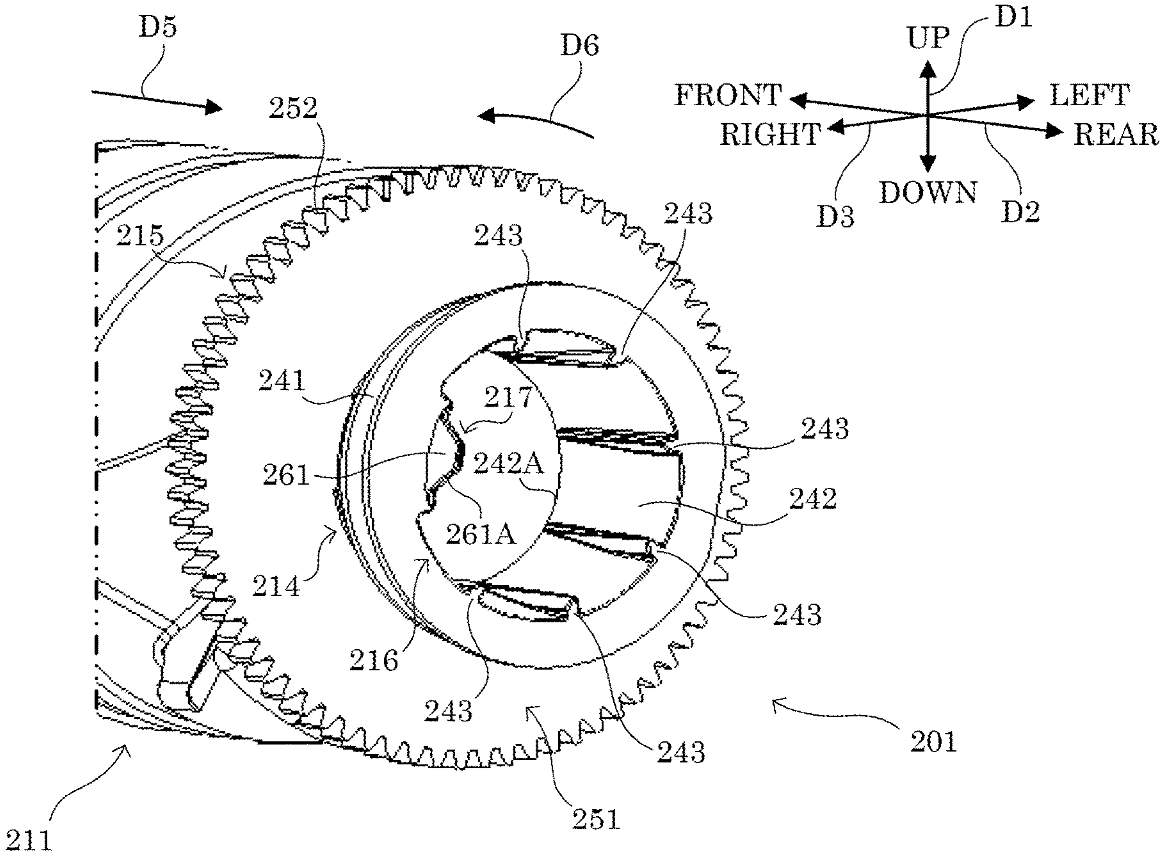
FIG. 18 is a perspective view showing the configuration in the periphery of the communication portion of the image forming apparatus according to the embodiment of the present invention.
Figure 19:
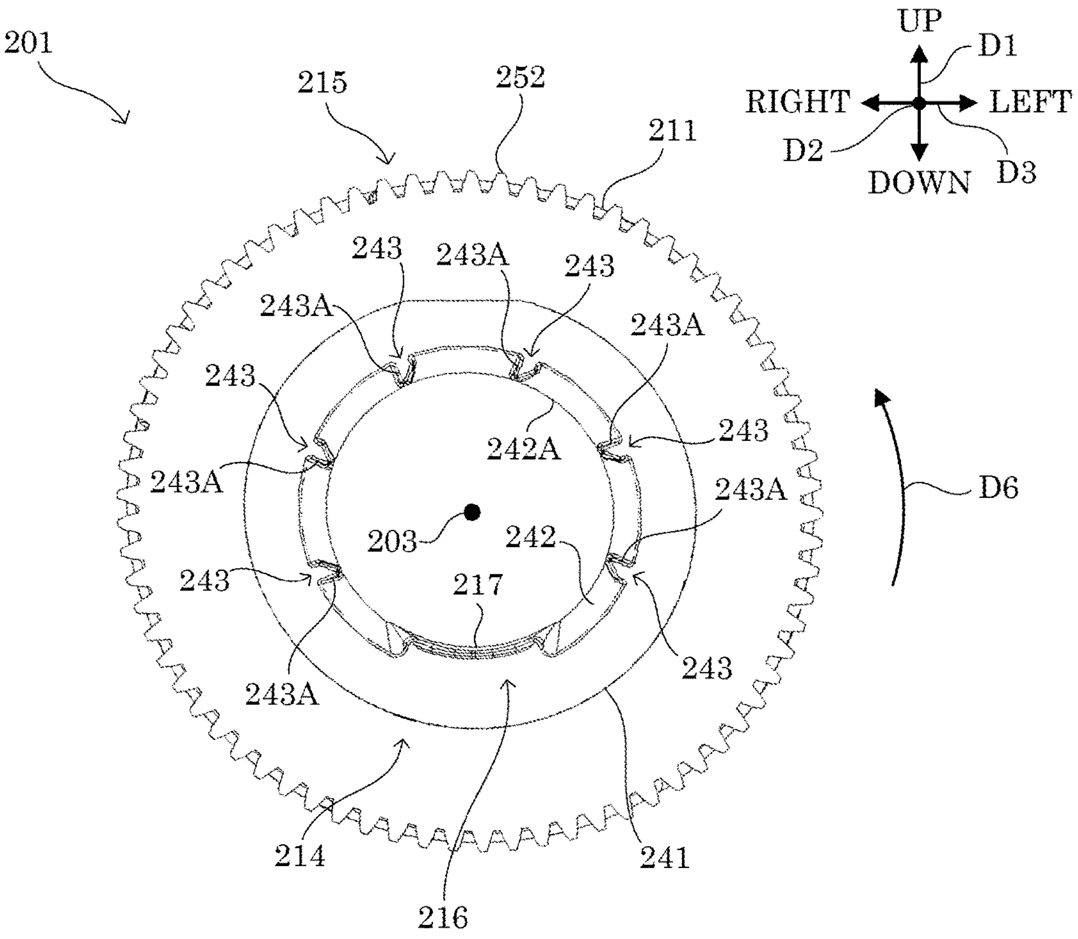
FIG. 19 is a back view showing a configuration of an opening portion of the image forming apparatus according to the embodiment of the present invention.

As shown in FIG. 18 and FIG. 19, six ridge portions 243 are provided with intervals therebetween along the inner circumference of the inner circumferential portion 242.

As shown in FIG. 18, the ridge portions 243 extend from the end portion 242A of the inner circumferential portion 242 on the upstream side of the conveying direction D5 to the end portion on the downstream side, that is, to the opening portion 216.

As shown in FIG. 19, the ridge portions 243 extend from the inner circumferential surface of the communication portion 214 toward the conveying direction D5 intersecting with the inner circumferential surface. In other words, the ridge portions 243 are provided more on the outer side of the radial direction than the end portion 242A of the inner circumferential portion 242 on the upstream side of the conveying direction D5. For example, apexes of the ridge portions 243 are formed along a straight line that passes through the end portion 242A and is parallel to the rotation shaft 203 (see FIG. 19). In this case, a protrusion amount of the ridge portions 243 from the inner circumferential portion 242 gradually increases along the conveying direction D5. Thus, it becomes possible to avoid a situation where the end portions of the ridge portions 243 on the upstream side of the conveying direction D5 and the inner circumferential portion 242 become uneven. In other words, it becomes possible to avoid a situation where the unevenness hampers conveyance of toner.

As shown in FIG. 19, the ridge portions 243 each include a wall surface 243A facing the downstream side of the first direction D6. The wall surface 243A draws toner in contact with the wall surface 243A and causes it to slip downwardly in accordance with the rotation of the storage portion 211 in the first direction D6.

As shown in FIG. 19, the ridge portions 243 are formed in a nail shape in which a protrusion tip end portion faces the downstream side of the first direction D6. In other words, the ridge portions 243 each include a tilted surface that tilts to the inner circumferential portion 242 from the end portion of the wall surface 243A on the inner side of the radial direction toward the upstream side of the first direction D6. Thus, the size of the ridge portions 243 can be reduced as compared to a configuration in which the ridge portion 243 includes the wall surface 243A and a wall surface facing the upstream side of the first direction D6.

With the inner circumferential portion 242 described above, it is possible to cause toner inside the communication portion 214 to slip toward the downstream side of the conveying direction D5. Moreover, by drawing and dropping toner by the ridge portions 243 and causing the dropped toner to come into contact with the inner circumferential portion 242, energy of the drop can be converted into the conveying force in the conveying direction D5 and imparted to the toner.

It is noted that the ridge portions 243 may be provided in an arbitrary section between the end portion 242A of the inner circumferential portion 242 on the upstream side of the conveying direction D5 and the opening portion 216. Further, the ridge portions 243 may be provided to extend along the conveying direction D5 with a constant protrusion amount from the inner circumferential portion 242. Furthermore, the ridge portions 243 may be in an arbitrary shape as long as the ridge portions 243 are formed along the rotation shaft 203 at the inner circumferential portion 242. Moreover, the number of ridge portions 243 to be provided at the inner circumferential portion 242 may be an arbitrary number including zero.

Figure 22:
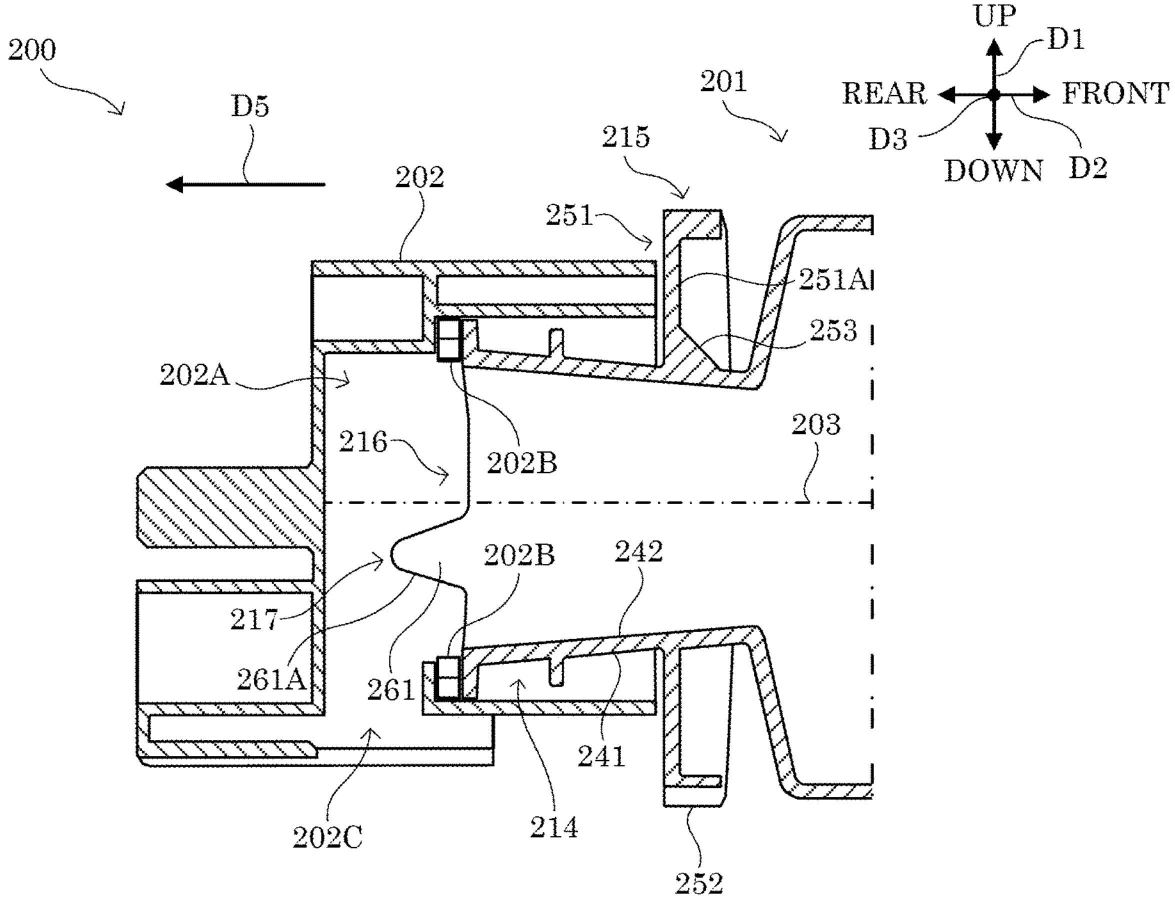
FIG. 22 is a cross-sectional view showing a configuration of the toner container of the image forming apparatus according to the embodiment of the present invention.

Incidentally, there is known, as the related art, an image forming apparatus including a stirring member which extends from inside the container body 201 toward the downstream side of the conveying direction D5 beyond the opening portion 216, for suppressing coagulation of toner that adheres onto the cap portion 202 (see FIG. 22).

In the image forming apparatus according to the related art described above, however, the container body 201 and the stirring member are constituted by different members, and thus troublesome tasks of attaching the stirring member to the container body 201 during manufacturing of the developer storage container are caused.

In contrast, in the image forming apparatus 100 according to the embodiment of the present invention, troublesome tasks caused during manufacturing of the toner container 200 can be reduced as will be described below.

Figure 17:
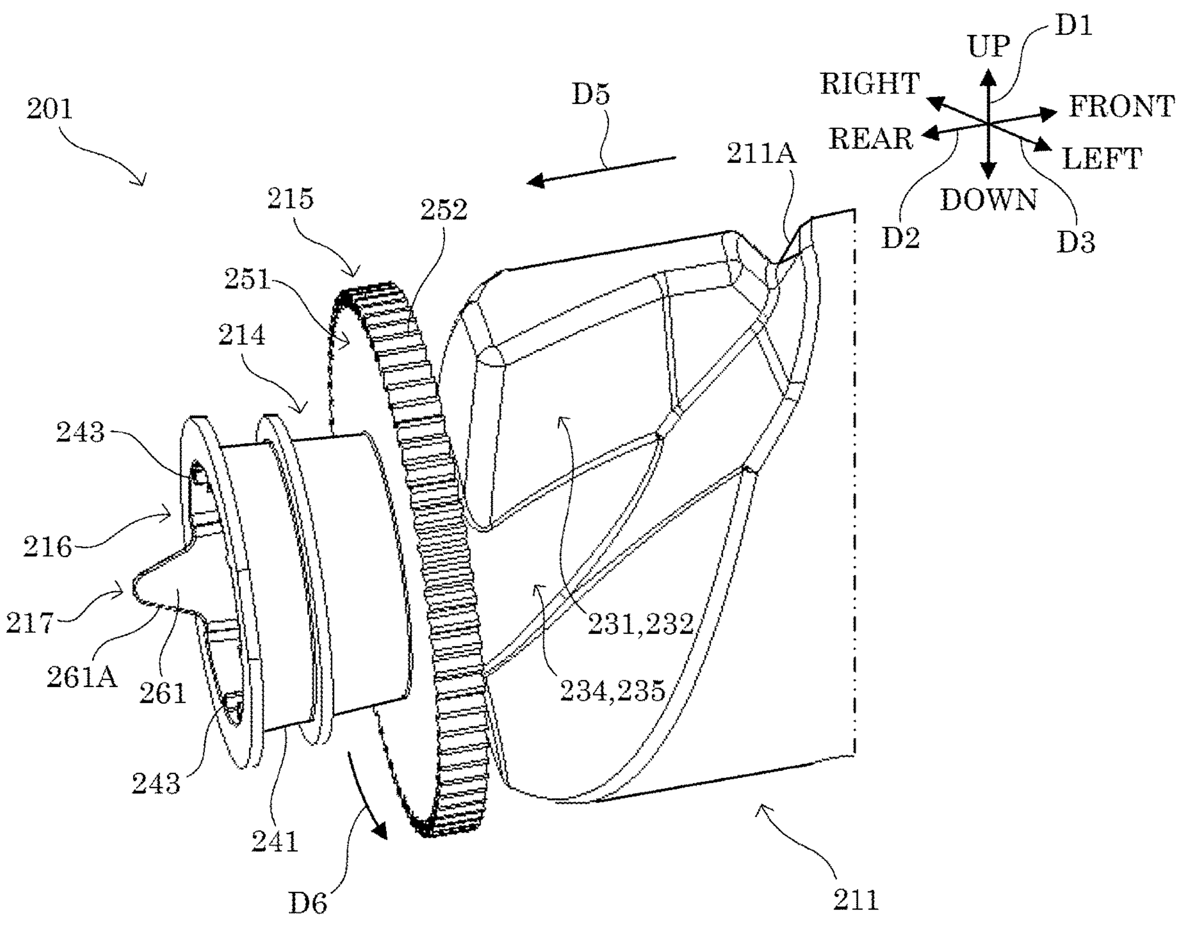
FIG. 17 is a perspective view showing a configuration in a periphery of a communication portion of the image forming apparatus according to the embodiment of the present invention.

As shown in FIG. 17, the container body 201 includes an extension portion 217.

The extension portion 217 is formed integrally with the container body 201. The extension portion 217 extends from inside the container body 201 toward the downstream side of the conveying direction D5 beyond the opening portion 216.

As shown in FIG. 18 and FIG. 19, the extension portion 217 is formed in a plate-like shape along the inner circumferential surface of the communication portion 214, and an extension base end portion thereof is supported by the inner circumferential portion 242 of the communication portion 214. Thus, a supporting area of the extension base end portion of the extension portion 217 at the inner circumferential portion 242 can be enlarged. In addition, a situation where the extension portion 217 hampers the movement of the toner in the communication portion 214 can be suppressed.

As shown in FIG. 17 and FIG. 18, an exposure portion 261 of the extension portion 217, that is exposed outside the container body 201, has an end surface 261A on the downstream side of the first direction D6 formed to tilt toward the upstream side of the first direction D6 along the conveying direction D5. For example, the exposure portion 261 is formed in a substantially triangular shape in a side view (see FIG. 17). Thus, a force along the first direction D6 that is applied to the extension base end portion of the extension portion 217 when the extension portion 217 comes into contact with the toner that has adhered onto the inner wall of the cap portion 202 can be dispersed. Therefore, durability of the extension portion 217 can be improved.

Figure 20:
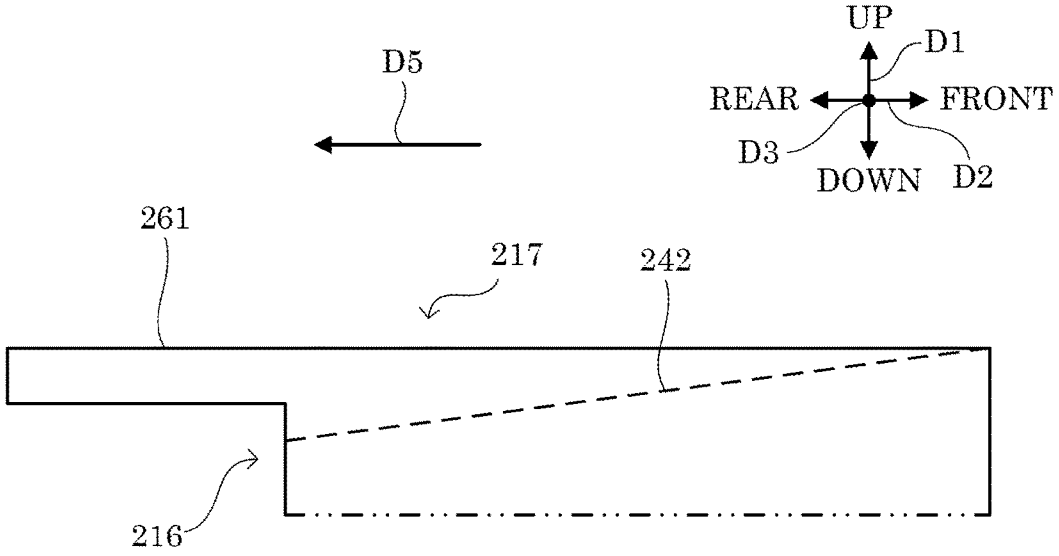
FIG. 20 is a cross-sectional view showing a configuration of an extension portion of the image forming apparatus according to the embodiment of the present invention.

As shown in FIG. 19 and FIG. 20, similar to the ridge portions 243, the extension portion 217 extends from the inner circumferential surface of the communication portion 214 toward the conveying direction D5 intersecting with the inner circumferential surface. In other words, the extension portion 217 is provided more on the outer side of the radial direction than the end portion 242A of the inner circumferential portion 242 on the upstream side of the conveying direction D5. For example, the upper portion of the extension portion 217 is formed along the straight line that passes through the end portion 242A and is parallel to the rotation shaft 203 (see FIG. 19). Moreover, the extension portion 217 extends from the opening portion 216 toward the downstream side of the conveying direction D5 with a predetermined thickness in a direction orthogonal to the rotation shaft 203 (see FIG. 19 and FIG. 20). Thus, a situation where the end portion of the extension portion 217 on the upstream side of the conveying direction D5 and the inner circumferential portion 242 become uneven can be avoided. In other words, a situation where the unevenness hampers the conveyance of toner can be avoided.

With the extension portion 217 described above, it is possible to save the troublesome tasks of attaching the extension portion 217 during manufacturing of the toner container 200. Therefore, troublesome tasks caused during manufacturing of the toner container 200 can be reduced.

It is noted that the extension portion 217 may be provided to extend along the conveying direction D5 with a constant protrusion amount from the inner circumferential portion 242. Moreover, the exposure portion 261 may be formed in an arbitrary shape. Further, the extension portion 217 may be formed in a shape different from the plate-like shape along the inner circumferential surface of the communication portion 214.

Incidentally, in the conventional image forming apparatus, heat generated by the drive of the apparatus body may be transmitted to the storage portion 211 via the gear portion 215. In this case, toner inside the storage portion 211 is heated, and the toner is apt to be coagulated.

In contrast, in the image forming apparatus 100 according to the embodiment of the present invention, heat transmission from the body side via the gear portion 215 can be suppressed as will be described below.

Figure 23:
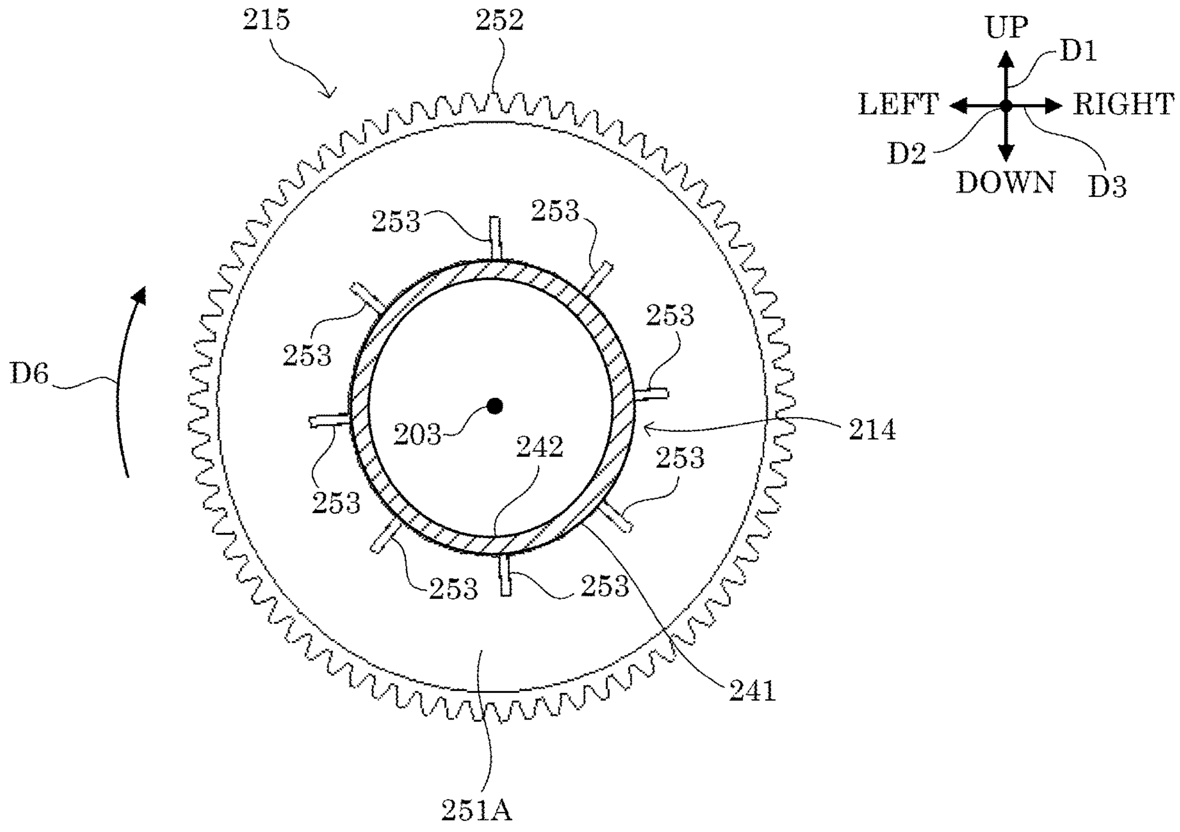
FIG. 23 is a cross-sectional view showing a configuration of a gear portion of the image forming apparatus according to the embodiment of the present invention.

As shown in FIG. 21 and FIG. 23, the gear portion 215 includes a support portion 251, a teeth portion 252, and ribs 253.

As shown in FIG. 21 and FIG. 23, the support portion 251 is formed in a disk shape concentric with the rotation shaft 203 at the outer circumferential portion 241 of the communication portion 214.

As shown in FIG. 21 and FIG. 23, the teeth portion 252 is provided along an edge portion of a support surface 251A orthogonal to the conveying direction D5 in the support portion 251. The support surface 251A is a surface of the support portion 251 on the upstream side of the conveying direction D5. The teeth portion 252 includes a support portion annularly formed along the edge portion of the support surface 251A and teeth formed on an outer circumferential surface of the support portion. The teeth portion 252 intermesh with the third gear 45 of the drive portion 32.

As shown in FIG. 21 and FIG. 23, the ribs 253 are formed to extend from the outer circumferential portion 241 of the communication portion 214 along the radial direction on the support surface 251A. As shown in FIG. 21, the ribs 253 are formed to tilt outwardly in the radial direction along the conveying direction D5. As shown in FIG. 23, extension ends of the ribs 253 do not reach the teeth portion 252. Thus, a situation where heat is transmitted from the teeth portion 252 to the ribs 253 to thus be transmitted to the communication portion 214 without the intervention of the support portion 251 can be avoided.

As shown in FIG. 23, the gear portion 215 includes eight ribs 253 arranged at regular intervals along the outer circumferential surface of the communication portion 214. It is noted that the number of ribs 253 to be provided in the gear portion 215 may be an arbitrary number.

Herein, the gear portion 215 is provided in a size in which a tip diameter is larger than the diameter of the storage portion 211 as shown in FIG. 12, FIG. 14, and FIG. 19. Thus, it becomes possible to cause the gear portion 215 to intervene in a movement path of an airflow generated along the conveying direction D5 by the rotation of the storage portion 211 and to cool the gear portion 215 by the airflow, as compared to a configuration in which the tip diameter is smaller than the diameter of the storage portion 211. It is also possible to suppress an occurrence of an inconvenience such as dispersion of toner that has leaked from the cap portion 202, which is caused by the airflow flowing more to the downstream side of the conveying direction D5 than the gear portion 215.

In addition, in the gear portion 215, the teeth portion 252 and the ribs 253 are provided on the support surface 251A which is a surface of the support portion 251 on the upstream side of the conveying direction D5. Thus, a contact area between the airflow and the gear portion 215 can be made larger than that of a configuration in which the teeth portion 252 and the ribs 253 are provided on a surface of the support portion 251 on the downstream side of the conveying direction D5. In other words, a cooling effect of the gear portion 215 by the airflow can be enhanced. Further, the airflow that has reached the support surface 251A can be guided to the opposite side of the conveying direction D5 along the shape of the gear portion 215, and thus a situation where the airflow flows more to the downstream side of the conveying direction D5 than the gear portion 215 can be suppressed more effectively.

With the gear portion 215 described above, heat transmission from the body side via the gear portion 215 can be suppressed.

It is noted that the gear portion 215 may be provided in a size in which the tip diameter is smaller than the diameter of the storage portion 211. Moreover, the support surface 251A may be a surface of the support portion 251 on the downstream side of the conveying direction D5. Moreover, the ribs 253 may be provided to extend from the teeth portion 252 along the radial direction on the support surface 251A. Furthermore, the ribs 253 may be provided at both the teeth portion 252 and the outer circumferential portion 241 of the communication portion 214.

The invention claimed is:

1. A developer storage container used in an attitude in which a rotation shaft thereof is disposed along a horizontal plane, comprising:

- a container body which includes an opening portion opened toward a conveying direction along the rotation shaft and is rotated in a specific direction about the rotation shaft to convey developer stored therein in the conveying direction and discharge the developer from the opening portion;
- a cap portion which downwardly guides the developer discharged from the opening portion at a position more on a downstream side of the conveying direction than the opening portion; and
- an extension portion which is formed integrally with the container body and extends from inside the container body toward the downstream side of the conveying direction beyond the opening portion, wherein
- the container body includes:
  - a storage portion which is rotated in the specific direction to convey the developer stored therein in the conveying direction, and
  - a communication portion which extends in a tubular shape concentric with the rotation shaft from an end portion of the storage portion on the downstream side of the conveying direction toward the conveying direction, and causes the opening portion and the storage portion to communicate with each other,
- the extension portion is formed in a plate shape along an inner circumferential surface of the communication portion, and an extension base end portion thereof is supported by an inner circumferential portion of the communication portion, an exposure portion of the extension portion, that is exposed outside the container body, has an end surface on a downstream side of the specific direction formed to tilt toward an upstream side of the specific direction along the conveying direction, and the exposure portion protrudes in a triangular shape whose width along the specific direction tapers in the conveying direction from the opening portion.

2. The developer storage container according to claim 1, wherein the inner circumferential portion of the communication portion is formed in a tapered shape that widens in a radial direction along the conveying direction.

3. The developer storage container according to claim 2, wherein the extension portion extends from the inner circumferential surface of the communication portion toward the conveying direction.

4. An image forming apparatus, comprising:

the developer storage container according to claim 1; and an image forming portion which forms an image using the developer supplied from the developer storage container.

* * * * *